(12) United States Patent
Huang et al.

(10) Patent No.: US 10,534,801 B2
(45) Date of Patent: Jan. 14, 2020

(54) MAP SCREEN DETERMINING METHOD AND APPARATUS

(71) Applicant: Huawei Technologies Co., Ltd., Shenzhen (CN)

(72) Inventors: Xueyan Huang, Shenzhen (CN); Hao Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 15/454,582

(22) Filed: Mar. 9, 2017

(65) Prior Publication Data

US 2017/0185631 A1    Jun. 29, 2017

Related U.S. Application Data

(63) Continuation of application No. PCT/CN2015/088005, filed on Aug. 25, 2015.

(30) Foreign Application Priority Data

Sep. 12, 2014  (CN) .......................... 2014 1 0466661

(51) Int. Cl.
*G06F 16/29* (2019.01)
*G06F 16/9535* (2019.01)
(Continued)

(52) U.S. Cl.
CPC ............ *G06F 16/29* (2019.01); *G06F 3/0482* (2013.01); *G06F 3/04817* (2013.01); *G06F 16/9535* (2019.01)

(58) Field of Classification Search
CPC combination set(s) only.
See application file for complete search history.

(56) References Cited

U.S. PATENT DOCUMENTS

2009/0113319 A1   4/2009  Dawson et al.
2009/0144639 A1*  6/2009  Nims ................. A63B 24/0059
                                                             715/757
(Continued)

FOREIGN PATENT DOCUMENTS

CN            1425897 A      6/2003
CN          101606039 A     12/2009
(Continued)

OTHER PUBLICATIONS

Machine Translation and Abstract of Chinese Publication No. CN102760163, Oct. 31, 2012, 22 pages.
(Continued)

*Primary Examiner* — Thomas G Black
*Assistant Examiner* — Ana D Thomas
(74) *Attorney, Agent, or Firm* — Conley Rose, P.C.

(57) ABSTRACT

A map screen determining method and apparatus, which includes obtaining profile data in a track dimension of a target digital person, where the target digital person is generated by a digital person generation system and consists of multiple dimensions of target user profiles corresponding to a target user, and the target user profiles are generated by processing multiple dimensions of data from multiple data sources, determining map data of a target area, where the target area is a specific map area that needs to be presented to a user, and determining a tracing map screen according to the profile data in the track dimension of the target digital person and the map data, where the tracing map screen represents a track feature of the target digital person in the target area.

20 Claims, 10 Drawing Sheets

(51) Int. Cl.
*G06F 3/0481* (2013.01)
*G06F 3/0482* (2013.01)

(56) References Cited

U.S. PATENT DOCUMENTS

| | | | |
|---|---|---|---|
| 2011/0231419 A1* | 9/2011 | Papke | G06F 16/784 707/756 |
| 2013/0339891 A1 | 12/2013 | Blumenberg et al. | |
| 2014/0095303 A1 | 4/2014 | Jones et al. | |
| 2014/0221089 A1 | 8/2014 | Fortkort | |
| 2015/0262066 A1* | 9/2015 | Li | G06N 3/006 706/61 |
| 2016/0055417 A1 | 2/2016 | Wilson et al. | |
| 2016/0189032 A1 | 6/2016 | Horvitz et al. | |

FOREIGN PATENT DOCUMENTS

| | | |
|---|---|---|
| CN | 102164153 A | 8/2011 |
| CN | 102760163 A | 10/2012 |
| CN | 103635895 A | 3/2014 |
| CN | 103886037 A | 6/2014 |
| CN | 103984763 A | 8/2014 |
| CN | 103988203 A | 8/2014 |
| CN | 104933049 A | 9/2015 |
| WO | 2013114558 A1 | 8/2013 |

OTHER PUBLICATIONS

Machine Translation and Abstract of Chinese Publication No. CN103886037, Jun. 25, 2014, 14 pages.
Foreign Communication From a Counterpart Application, PCT Application No. PCT/CN2015/088005, English Translation of International Search Report dated Oct. 28, 2015, 2 pages.
Foreign Communication From a Counterpart Application, PCT Application No. PCT/CN2015/088005, English Translation of Written Opinion dated Oct. 28, 2015, 6 pages.
Machine Translation and Abstract of Chinese Publication No. CN102164153, Aug. 24, 2011, 15 pages.
Foreign Communication From a Counterpart Application, Chinese Application No. 2014104666613, Chinese Search Report dated Mar. 11, 2018, 2 pages.
Foreign Communication From a Counterpart Application, Chinese Application No. 2014104666613, Chinese Office Action dated Mar. 26, 2018, 6 pages.
Machine Translation and Abstract of Chinese Publication No. CN103984763, Aug. 13, 2014, 31 pages.
Foreign Communication From a Counterpart Application, Chinese Application No. 201410466661.3, Chinese Search Report dated May 24, 2019, 2 pages.
Foreign Communication From a Counterpart Application, Chinese Application No. 201410466661.3, Chinese Office Action dated Jun. 4, 2019, 6 pages.

* cited by examiner

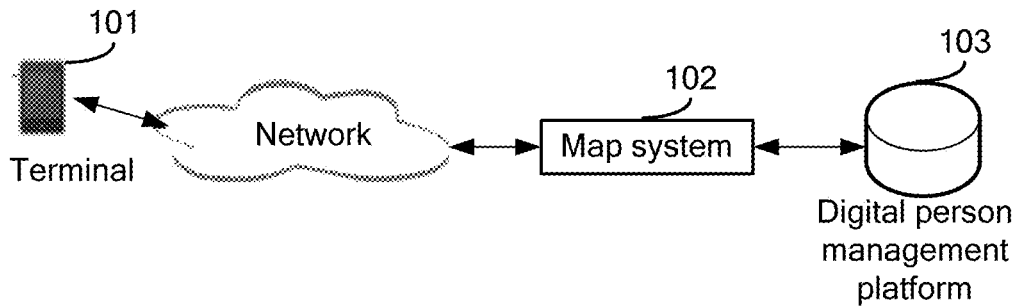

Obtain profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources  ~ S201

Determine map data of a target area, where the target area is a specific map area that needs to be presented to a user  ~ S202

Determine a tracing map screen according to the profile data in the track dimension of the target digital person and the map data, where the tracing map screen represents a track feature of the target digital person in the target area  ~ S203

FIG. 2

MAP SCREEN DETERMINING METHOD AND APPARATUS

CROSS-REFERENCE TO RELATED APPLICATIONS

This application is a continuation of International Patent Application No. PCT/CN2015/088005 filed on Aug. 25, 2015, which claims priority to Chinese Patent Application No. 201410466661.3 filed on Sep. 12, 2014. The disclosures of the aforementioned applications are hereby incorporated by reference in their entireties.

TECHNICAL FIELD

The present disclosure relates to the communications field, and in particular, to a map screen determining method and apparatus in the communications field.

BACKGROUND

In daily life, electronic maps have rich types, are used on diverse terminals, and are convenient and quick to operate, and therefore have been widely used. Well-known electronic map systems include BAIDU maps, AUTONAVI maps, GOOGLE maps, and the like. A user uses these map systems to perform an operation such as search or navigation. As a platform that connects a digital world and the physical world, an electronic map system plays an increasingly significant role. Although an existing map system has a specific screening and sorting function, for example, screening is performed according to price ranges, place types, comments, or the like, screening options are very limited, and screening operations are relatively complex. More importantly, there is no difference between information presented in the existing map system to all users, lacking personalization. For example, it is very difficult to answer the following questions with the current map system.

Is this consuming place suitable for me?

Does this restaurant fit my taste?

If I am in a tour, where do natives go for a dinner or play preferentially?

If I am in a tour for couples, which places are suitable for me?

If I want to treat my boss to a dinner, which place suits his/her level?

If a user wants to obtain answers to the foregoing questions, before leaving, the user first needs to find related address information on a search engine, such as BAIDU or GOOGLE, search for related comments on a public word-of-mouth website, such as Dianping.com, and find, on a map application, such as BAIDU maps, Tiger map, GOOGLE maps, a path for reaching this address. Obviously, the process is relatively complex for the user. In addition, information, for example, comments, is very important information for the user. However, due to different life backgrounds, different users have different perceptions and feelings on one thing. In this case, possibly, comments of a user cannot represent that another user feels the same. For example, on a public word-of-mouth website such as Dianping.com, regardless of favorable comments on "Zhanjiang Chicken Restaurant," a northeasterner may not go for a dinner, and regardless of high scores and favorable comments on "Li Liangui," a Cantonese does not select the restaurant.

In the foregoing examples, presenting all information of all restaurants on a map to a user also brings inconvenience to the user. This is because some information is unnecessary or unimportant for the user. For example, there are restaurants such as WANG STEAK, RAINDROP CAFE, and UBC Cafe within an area. The restaurants are presented on the map to all the users when different users search for dining places within the area. For a user or a person that the user wants to obtain and that is related to the user, WANG STEAK is over budget for spending and belongs to information noise, and RAINDROP CAFE and UBC Cafe are results expected by the user. However, another user may select WANG STEAK, Super Buffet, or Tairyo Teppanyaki, but may not select UBC Cafe.

In addition, an existing map generally provides one or several specific paths. However, in real life, for some areas, a person who is more familiar with the areas may provide more proper (which consumes shortest time or requires lowest costs) travel routes or may provide a shortcut through which a place is reached more conveniently. Generally, the information cannot be provided by the map system, but only can be propagated from mouth to mouth or be obtained by searching corresponding information and performing determining by a user.

Some existing map systems may provide some modes for user selection, or a user provides some behavior features of the user, and map information is filtered according to the modes or the behavior features provided by the user. This manner is still relatively one-sided and limited, and absolutely personalized services cannot be provided to the user. In addition, manual selection or input is performed by the user, which brings inconvenience to the user.

SUMMARY

Embodiments of the present disclosure provide a map screen determining method and apparatus, which can automatically and flexibly provide a personalized map service.

According to a first aspect, a map screen determining method is provided, where the method includes obtaining profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources, determining map data of a target area, where the target area is a specific map area that needs to be presented to a user, and determining a tracing map screen according to the profile data in the track dimension of the target digital person and the map data, where the tracing map screen represents a track feature of the target digital person in the target area.

With reference to the first aspect, in a first possible implementation manner of the first aspect, determining a tracing map screen according to the profile data in the track dimension of the target digital person and the map data includes determining, according to the profile data in the track dimension of the target digital person in the target area, a frequency at which the target digital person appears at a place in the target area, generating, according to the frequency at which the target digital person appears at the place in the target area, a visual element used to represent the frequency at which the target digital person appears at the place in the target area, where the visual element is used to represent the track feature of the target digital person in the target area, and determining a map screen including the visual element as the tracing map screen.

With reference to the first possible implementation manner of the first aspect, in a second possible implementation manner of the first aspect, the visual element is a thermodynamic diagram corresponding to the frequency at which the target digital person appears at the place in the target area.

With reference to the first possible implementation manner of the first aspect, in a third possible implementation manner of the first aspect, the visual element includes at least two different identifiers corresponding to the frequency at which the target digital person appears at the place in the target area.

With reference to the third possible implementation manner of the first aspect, in a fourth possible implementation manner of the first aspect, the tracing map screen further includes a legend used to indicate a correspondence between the identifiers and the frequency.

With reference to any one of the first aspect or the first to the fourth possible implementation manners of the first aspect, in a fifth possible implementation manner of the first aspect, before obtaining profile data in a track dimension of a target digital person, the method further includes presenting a digital person display widget to the user, where the digital person display widget is in a first state, and the first state indicates that no profile data in a track dimension of a digital person is loaded on a current map screen, obtaining a first operation action performed by the user on the digital person display widget in the first state, presenting a digital person selection widget to the user according to the first operation action, where the digital person selection widget includes multiple digital person objects available for loading, and determining, as the target digital person, a digital person corresponding to a digital person object selected by the user, and after determining a tracing map screen according to the profile data in the track dimension of the target digital person and the map data, the method further includes presenting the map screen to the user, and presenting a second state of the digital person display widget to the user, where the second state indicates that the profile data in the track dimension of the target digital person is loaded on the current map screen.

With reference to the fifth possible implementation manner of the first aspect, in a sixth possible implementation manner of the first aspect, the method further includes obtaining a second operation action performed by the user on the digital person display widget in the second state, determining personal background information of the target digital person according to the second operation action, and presenting a digital person information widget to the user, where the digital person information widget includes the personal background information of the target digital person.

With reference to any one of the first aspect or the first to the sixth possible implementation manners of the first aspect, in a seventh possible implementation manner of the first aspect, the method further includes obtaining a third operation action performed by the user on a target place on the tracing map screen, and presenting a target place information widget to the user according to the third operation action, where the target place information widget includes statistical information, related to the target place, of the digital person.

According to a second aspect, a map screen determining apparatus is provided, where the apparatus includes a first obtaining module configured to obtain profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources, a first determining module configured to determine map data of a target area, where the target area is a specific map area that needs to be presented to a user, and a second determining module configured to determine a tracing map screen according to the profile data in the track dimension of the target digital person obtained by the first obtaining module and the map data determined by the first determining module, where the tracing map screen represents a track feature of the target digital person in the target area.

With reference to the second aspect, in a first possible implementation manner of the second aspect, the second determining module is further configured to determine, according to the profile data in the track dimension of the target digital person in the target area, a frequency at which the target digital person appears at a place in the target area, generate, according to the frequency at which the target digital person appears at the place in the target area, a visual element used to represent the frequency at which the target digital person appears at the place in the target area, where the visual element is used to represent the track feature of the target digital person in the target area, and determine a map screen including the visual element as the tracing map screen.

With reference to the first possible implementation manner of the second aspect, in a second possible implementation manner of the second aspect, the visual element is a thermodynamic diagram corresponding to the frequency at which the target digital person appears at the place in the target area.

With reference to the first possible implementation manner of the second aspect, in a third possible implementation manner of the second aspect, the visual element includes at least two different identifiers corresponding to the frequency at which the target digital person appears at the place in the target area.

With reference to the third possible implementation manner of the second aspect, in a fourth possible implementation manner of the second aspect, the tracing map screen further includes a legend used to indicate a correspondence between the identifiers and the frequency.

With reference to any one of the second aspect or the first to the fourth possible implementation manners of the second aspect, in a fifth possible implementation manner of the second aspect, the apparatus further includes a presentation module configured to present a digital person display widget to the user, where the digital person display widget is in a first state, and the first state indicates that no profile data in a track dimension of a digital person is loaded on a current map screen, and a second obtaining module configured to obtain a first operation action performed by the user on the digital person display widget presented by the presentation module. The presentation module is further configured to present a digital person selection widget to the user according to the first operation action obtained by the second obtaining module, where the digital person selection widget includes multiple digital person objects available for loading. The apparatus further includes a third determining module configured to determine, as the target digital person, a digital person corresponding to a digital person object selected by the user, and after the second determining module determines the tracing map screen according to the profile data in the track dimension of the target digital person and the map data, the presentation module is further configured to present the tracing map screen to the user, and present a second state of the digital person display widget to the user, where the second state indicates that the profile data in the track dimension of the target digital person is loaded on the current map screen.

With reference to the fifth possible implementation manner of the second aspect, in a sixth possible implementation manner of the second aspect, the apparatus further includes a third obtaining module configured to obtain a second operation action performed by the user on the digital person display widget in the second state, and a fourth determining module configured to determine personal background information of the target digital person according to the second operation action obtained by the third obtaining module, and the presentation module is further configured to present a digital person information widget to the user, where the digital person information widget includes the personal background information, of the target digital person, determined by the fourth determining module.

With reference to any one of the second aspect or the first to the sixth possible implementation manners of the second aspect, in a seventh possible implementation manner of the second aspect, the apparatus further includes a fourth obtaining module configured to obtain a third operation action performed by the user on a target place on the tracing map screen, and the presentation module is further configured to present a target place information widget to the user according to the third operation action obtained by the fourth obtaining module, where the target place information widget includes statistical information, related to the target place, of the digital person.

With reference to any one of the second aspect or the first to the seventh possible implementation manners of the second aspect, in an eighth possible implementation manner of the second aspect, the apparatus is a terminal.

According to a third aspect, a map system is provided, where the map system includes a user interaction module configured to interact with a user, and receive and respond to a user operation, a judgment module configured to determine whether a digital person display function is enabled, a map database configured to store map data, an analysis module configured to determine, according to a user instruction obtained by the user interaction module, map data that needs to be read, a map data reading module configured to read the map data in the map database according to an analysis result of the analysis module, a digital human screen configured to obtain data, obtained by the user interaction module, about a digital person selected by the user, a data conversion module configured to convert the data, obtained by the digital human screen, about the digital person to data available for the map system, a data processing module configured to process the map data and the data about the digital person, and a drawing display module configured to generate, according to the map data and the data about the digital person that are processed by the data processing module, a tracing map screen for output.

Based on the foregoing technical solutions, according to the map screen determining method and apparatus in the embodiments of the present disclosure, profile data in a track dimension of a target digital person is obtained, map data of a target area is determined, and a tracing map screen is determined according to the profile data in the track dimension of the target digital person and the map data to indicate a track feature of the target digital person in the target area.

In this case, personalized map services can be automatically and flexibly provided to a user, improving user experience.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 1 is a schematic diagram of an architecture that applies a map screen determining method according to an embodiment of the present disclosure;

FIG. 2 is a schematic flowchart of a map screen determining method according to an embodiment of the present disclosure;

DESCRIPTION OF EMBODIMENTS

Figure 3A:
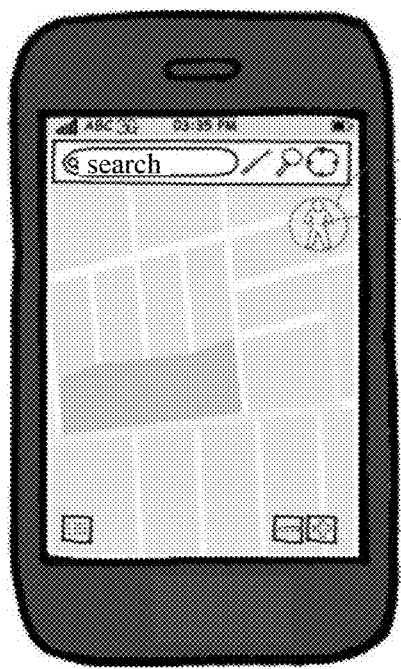
FIG. 3A, FIG. 3B and FIG. 3C are a schematic diagram of a map screen determining method according to an embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Before description is provided for a map screen determining method and apparatus, a digital person, a digital person generation method and system, and other related content that are used in the embodiments of the present disclosure are first illustrated.

The digital person generation method includes defining a digital person model, where the digital person model includes multiple dimensions of user profile models, obtaining multiple dimensions of data of a specific user from multiple data sources, and processing, based on the multiple dimensions of user profile models included in the digital person model, the multiple dimensions of data of the specific user, to generate multiple dimensions of user profiles corresponding to the specific user, where the multiple dimensions of user profiles of the specific user form a digital person corresponding to the specific user.

According to the foregoing digital person generation method, multiple dimensions of data of a user from multiple data sources is obtained, and the data is processed to generate, based on a digital person model, a digital person including multiple dimensions of user profiles.

It should be understood that, a user profile in one dimension is presentation of features of a user in the dimension in the physical world, and is a virtual profile that is in the dimension and that is obtained on a basis of profound understanding of real data. A digital person corresponding to a user in the physical world may be formed by combining multiple dimensions of user profiles. Features of the user in the physical world may be described from multiple dimensions using the digital person. A user profile in one dimension is generated by mining data according to a user profile model in the corresponding dimension. The dimension may involve an image, health, a behavioural habit, a social pattern, a consumption habit, an interest and a hobby, and the like, and may further include other multiple dimensions corresponding to an individual in the physical world.

A digital person model is defined in a digital person generation system, and the digital person model includes multiple dimensions of user profile models. A user profile model in a dimension represents a feature and a knowledge category, which are extracted from related collected data, of a user in the dimension. The digital person model including the multiple dimensions of user profile models defines, based on multiple dimensions of available data sources, a stereoscopic digital person from multiple different dimensions. During determining of the different dimensions of user profile models included in the digital person model, at least the following elements should be taken into consideration. A usable data source, a feature type that can be obtained by mining, a primary requirement of the digital person generation system, an updatable digital person feature requirement newly defined by a third-party client, and the like.

Further, a profile model configuration library may be provided in the digital person generation system to maintain multiple dimensions of user profile models included in a digital person model required for generating a digital person. According to the digital person generation system, these user profile models may be predefined and periodically updated, that is, added, deleted, or modified. For example, a digital person model maintained on a platform may correspondingly define the user profile models, such as a user profile model in an image dimension, a user profile model in a health dimension, a user profile model in a behavioural habit dimension, a user profile model in a social pattern dimension, a user profile model in a consumption habit dimension, a user profile model in an interest and hobby dimension, and the like, on which no limitation is imposed.

It should be understood that, the digital person generation system may determine, according to user attributes, a digital person model including different user profile models for user groups having different attributes. A user attribute may be used to describe a user information type. Taking a user profession as an example, for user profile models determined for a doctor group and a teacher group, in addition to user profile models that are common to all users, such as a user profile model in an image dimension and a user profile model in a health dimension, the doctor group may further include a user profile model in a dimension corresponding to an attribute that a profession of the doctor group is doctor, and the teacher group may further include a user profile model in a dimension corresponding to an attribute that a profession of the teacher group is teacher, on which no limitation is imposed.

In addition, the digital person generation system may further create or modify a corresponding user profile model after receiving a customization requirement of a client. For example, the digital person generation system may include a digital person Application Programming Interface (API) in order to complete interaction between the digital person generation system and a third-party client. When the client has a requirement on a user profile in a specific dimension, but there is no corresponding user profile model in the profile model configuration library in the current digital person generation system, the client may feed the customization requirement back to the digital person generation system using the API such that the digital person generation system creates a new user profile model. Correspondingly, the digital person generation method may further include creating, according to a requirement of a client, a user profile model that is used to generate a user profile and corresponding to the requirement.

It should be understood that, by means of mining, data generated on various data platforms in a digital world for an individual in the physical world may provide an overall description of features in all dimensions corresponding to the individual in the physical world. Data of a user may be from multiple data sources, for example, may be from a mobile phone service platform, a real-time chat platform such as QQ, WECHAT, or LAIWANG, a social platform such as Microblog, a FORUM, or RENREN, or a shopping platform such as TAOBAO, Dangdang, or JINGDONG. In addition, the data may further include data that is related to the user and generated during communication of another user, on which no limitation is imposed.

Data collected from multiple data sources may be in multiple dimensions, for example, an image dimension, a health dimension, a behavioural habit dimension, a social dimension, a consumption habit dimension, and an interest and hobby dimension of a user, on which no limitation is imposed.

The digital person generation system may obtain multiple dimensions of data of multiple users that is from multiple data sources using at least one device of a terminal, a communications network element, or a data collection agent.

Data of each user may be obtained using a terminal. Information about an environment in which a user stays and information such as a user behaviour may be collected and obtained using a terminal, such as an intelligent terminal or a vehicle-mounted terminal, and various sensor apparatuses on the terminal, such as a global positioning system (GPS), a motion sensor, a light sensor, a microphone, and a camera. Track data, of a user, in a field may be obtained using operation data and recorded application tracks of various application software operating on the terminal, such as social software, motion monitoring software, and health monitoring software. In addition, the terminal may further record various WE MEDIA content generated by the user, such as pictures, audio, video, and text diaries. The terminal may report related data of the user to the digital person generation system periodically or randomly, or the digital person generation system may obtain related data of the user from the terminal periodically or randomly.

Data of each user may be further obtained using a communications network element. For example, a communications network element such as a Radio Network Controller (RNC) or a Home Location Register (HLR) includes a large amount of related data of the user that is generated during communication, and the digital person generation system may capture, from the communications network element, related data of multiple users.

Data of multiple users may be further obtained using a data collection agent. Further, the data collection agent captures comments, Internet surfing traces, and the like of a user on a network in a web crawling manner. For example, a record log of a user on a social network, an online shopping platform, a web search platform, a web service platform, or the like is captured. For another example, information related to the user and posted using various channels, for example, information related to the user in social media content or a log of a friend in a social circle of the user, is captured. The data collection agent may report the captured content to the digital person generation system periodically or randomly, or the digital person generation system may obtain related data of the user from the data collection agent periodically or randomly.

Generally, relatively concentrated and information-intensive user data may be obtained using a terminal, and relatively dispersed user data may be obtained using a communications network element or a data collection agent. In addition, user data may be obtained by another means or in another manner, on which no limitation is imposed.

It should be understood that, the digital person generation system may obtain data using its own device or module, or may receive, using a screen, data collected by a device or module outside the digital person generation system, on which no limitation is imposed.

It should also be understood that, a large amount of data obtained from multiple data sources using the digital person generation method may belong to multiple users. In this case, to which user the data belongs needs to be determined. Correspondingly, in the digital person generation method, the obtaining multiple dimensions of data of a specific user that is from multiple data sources includes obtaining multiple dimensions of data of multiple users that is from multiple data sources, and determining, among the multiple dimensions of data of the multiple users that is from the multiple data sources, and according to a belonging relationship between data and a user, the multiple dimensions of data that is from the multiple data sources and that belongs to the specific user.

Further, after obtaining a large amount of data from the multiple data sources, the digital person generation system determines, according to a belonging relationship between data and a user corresponding to a digital person, the multiple dimensions of data belonging to the specific user. For example, matching may be performed, according to a data source and data content, on information about a user corresponding to a digital person that already exists in the digital person generation system. The digital person generation system may store or update the data to an account of the user corresponding to the digital person, or directly mine or analyze the data and store or update an obtained result to an account of the user corresponding to the digital person when a piece of data matches related data of the user corresponding to the digital person that already exists. The digital person generation system may create a user account to store the data or information that is obtained by mining the data when a piece of data does not belong to the user corresponding to the digital person that already exists.

To determine the belonging relationship between the data and the user corresponding to the digital person, the digital person generation system may record and maintain a correspondence between a user identification (ID) of the digital person and another ID of the user in the physical world. For example, a Table may be maintained and updated in real time, where the Table records the user ID of the digital person and information about an individual in the physical world, such as a mobile phone number, a WECHAT account, a QQ account, a Microblog account, and a FORUM account. According to the Table, the digital person generation system may conveniently identify a belonging relationship between data and a user, and may conveniently query data of each user. For example, according to information recorded in the table, it may be identified that, a user with a WECHAT account "aaa111" and a user with a Microblog account "ccc222" are corresponding to a same user. Therefore, data obtained from the WECHAT account "aaa111" and data obtained from the Microblog account "ccc222" both belong to the user. In addition, the belonging relationship between data and a user may be further determined according to the data content. For example, if a piece of data is a piece of news, and deeds related to the user are reported in the news, it may be determined that the news is data belonging to the user.

The digital person generation method may further include performing data cleaning on the multiple dimensions of data of the specific user that is from the multiple data sources, extracting time and a keyword that are corresponding to content of data obtained after the cleaning, and annotating, using the time and the keyword as annotation information, the data obtained after the cleaning.

The processing, based on the multiple dimensions of user profile models included in the digital person model, the multiple dimensions of data of the specific user, to generate multiple dimensions of user profiles corresponding to the specific user includes processing, based on the multiple dimensions of user profile models included in the digital person model, the data obtained after the annotation, to generate the multiple dimensions of user profiles corresponding to the specific user.

Further, data cleaning is performed on the obtained multiple dimensions of data of the specific user that is from the multiple data sources in order to filter noisy data. Because the data may be from multiple data sources, the data may be heterogeneous. For example, the data may be structured data, semi-structured data, or unstructured data, that is, the user data may be text or a table, or may be a picture, audio, or a video. For structured data, structures of data from different data sources may be different. For example, data from TAOBAO and data from JINGDONG, both of which are shopping records, may have different structures. In this case, such data needs to be processed to make the data structures consistent such that data is managed conveniently, and convergence may be accelerated during subsequent mining operations.

The data obtained after the data cleaning may be text or a table, or may be a picture, audio, or a video, which is difficult to manage and analyze. Therefore, various heterogeneous data obtained after cleaning may be annotated. Further, time and a keyword that are corresponding to content included in the data obtained after the cleaning may be extracted, and the data obtained after the cleaning is annotated using the time and the keyword as annotation information such that a digital person is generated or information about a digital person is queried according to the annotation information. For example, for a picture about watching flag raising at Tian'anmen, annotation information of the picture may include that the time is Jan. 1, 2014 and keywords are flag raising. The annotation information may further include location information corresponding to the content included in the data such that a location of the content included in the data or a location at which an event occurs is identified. In addition, the annotation information may further include other information indicating data features, on which no limitation is imposed.

The data obtained after the annotation is easy to manage and analyze. When multiple dimensions of user profiles of the specific user are to be subsequently generated based on the multiple dimensions of user profile models, the data obtained after the annotation may be processed based on the multiple dimensions of user profile models, to generate the multiple dimensions of user profiles of the specific user.

In addition, the data obtained after the annotation may be stored to facilitate subsequent management and generation of and query about a digital person. Data storage and management may be implemented based on a HADOOP distributed platform. In addition, considering that data stored and managed on the platform includes various structured data, semi-structured data, and unstructured data, storage and management of the data involves a possibility of dynamic addition or deletion. Therefore, a non-relational database such as NoSQL may be used to store and manage the data. Further, as shown in Table 1, data may be stored and managed by category according to user ID corresponding to digital persons, and storage items may include a user ID to which data belongs, annotation information corresponding to data, a data file name, a storage location link of a data file, a data file type, and the like.

TABLE 1

| User ID | Annotation Information | Data File Name | Data File Location | Data File Type |
|---|---|---|---|---|
| First digital person | Time, location, and keyword | Picture | . . . | jpg |
| First digital person | Time, location, and keyword | Shopping record | . . . | xls |
| Second digital person | Time, location, and keyword | Medical examination report | . . . | doc |
| . . . | . . . | . . . | . . . | . . . |

The multiple dimensions of data of the specific user is processed based on the multiple dimensions of user profile models included in the digital person model, to generate the multiple dimensions of user profiles corresponding to the specific user, where the multiple dimensions of user profiles of the specific user form the digital person corresponding to the specific user. User profiles in corresponding dimensions may be generated based on the foregoing multiple dimensions of user profile models. The user profiles may include a user profile in an image dimension, a user profile in a health dimension, a user profile in a behavioural habit dimension, a user profile in a social pattern dimension, a user profile in a consumption habit dimension, a user profile in an interest and hobby dimension, and the like, which is not limited merely thereto. When the multiple dimensions of data of the specific user is being processed, a proper data mining algorithm may be called to mine and extract the multiple dimensions of user profiles of the specific user. The data mining algorithm may include at least one of a classification algorithm, a clustering algorithm, a regression algorithm, a reinforcement learning algorithm, a transfer learning algorithm, a deep learning algorithm, or an active learning algorithm, which is not limited merely thereto. The data mining algorithm may be configured in an algorithm library, which is defined and periodically maintained and updated by the digital person generation system.

Description is provided in the following using an example in which a user profile in a consumption habit dimension is generated based on a user profile model in a consumption habit dimension. For example, in an example of a user profile model in a consumption habit dimension, the model includes at least the data items, such as a user ID, a preferred consumption brand of a user, an affordable consumption amount of a user, frequent consumption time of a user, a frequent consumption place of a user, a preferred payment mode of a user, and the like.

The digital person generation system collects, using a terminal, a communications network element, a data collection agent, or the like, data related to consumption of a user. The data may be from a consumption record on a shopping platform, a consumption detail record of a credit card account, or the like. Table 2 shows a historical consumption record of a user, content of which includes a payment account, consumption time, a consumption place, a consumed brand, a consumption amount, a payment mode, and the like. Data of a user corresponding to a payment account, that is, a user corresponding to a user ID, is extracted, a corresponding data mining algorithm, such as a classification algorithm, a clustering algorithm, or a regression algorithm is called, and related statistical data of a user profile model in a consumption habit dimension may be obtained by analyzing historical consumption behaviour records of a user that are shown in Table 2, to generate a user profile of the user in a consumption habit dimension.

For example, as shown in Table 2, a user with a payment account "payment account A" and a user with a payment account "payment account 1" are both corresponding to a user with a user ID "first digital person." A user profile of the user in a consumption habit dimension may be obtained through analysis by performing data mining on data of the foregoing payment accounts, that is, "payment account A" and "payment account 1," according to a user profile model in a consumption habit dimension. The user profile in a consumption habit dimension includes that the user ID is "first digital person," a preferred consumption brand is "sports & outdoor brand," an affordable consumption amount of the user is "2000 to 5000 RMB," frequent consumption time of the user is "rest days, such as a Saturday or Sunday," frequent consumption places of the user are "shopping malls in Haidian district of Beijing," and a preferred payment mode of the user is "credit card payment."

TABLE 2

| Payment Account | Consumed Brand | Consumption Amount | Consumption Time | Consumption Place | Payment Mode |
|---|---|---|---|---|---|
| Payment account A | Nike | 1299 | 20140104 | Zhongguancun, Beijing | Credit card |
| Payment account 1 | Columbia | 3499 | 20140105 | Wudaokou, Beijing | Credit card |
| Payment account A | Adidas | 1399 | 20140119 | Zhongguancun, Beijing | Credit card |

TABLE 2-continued

| Payment Account | Consumed Brand | Consumption Amount | Consumption Time | Consumption Place | Payment Mode |
|---|---|---|---|---|---|
| Payment account 1 | North Face | 2499 | 20140125 | Wudaokou, Beijing | Credit card |
| ... | ... | ... | ... | ... | ... |

Multiple dimensions of user profiles of a specific user form a digital person corresponding to the specific user. A user profile in one dimension is presentation of features of a user in the dimension in the physical world, and is a virtual profile that is in the dimension and that is obtained on a basis of profound understanding of real data. According to a user profile model defined in a digital person model, multiple dimensions of user profiles may form a digital person corresponding to a user in the physical world, where features of a user in the physical world may be described from multiple dimensions using the digital person. The digital person generation system may further update an existing user profile according to the user profile model when newly obtaining data related to the specific user. It should be understood that, the updating may be replacing the original user profile with a new user profile generated using the newly obtained data, or may be retaining the original user profile, generating a new user profile, and describing features of the user in the dimension at different time stages using the original user profile and the new user profile.

After a digital person is generated, the digital person generation method may further include providing, to a client and according to a query condition input by the client, a user profile of a digital person corresponding to the query condition.

Further, the client may query a user profile of a digital person for a specific user group using an API. For example, if a client inputs a mobile phone number or Microblog account of an individual in the physical world to serve as a retrieval condition, a user profile of a user corresponding to a digital person may be retrieved. For another example, if a health situation of "suffering from hypertension" is input, and a consumption capability is "relatively high consumption capability," all users who suffer from hypertension as indicated by a user profile in a health dimension and have a relatively high consumption capability as indicated by a user profile in a consumption habit dimension may be obtained by query such that related medicine or therapeutic devices are recommended to these users. It should be understood that sequence numbers of the foregoing processes do not mean execution sequences. The execution sequences of the processes should be determined according to functions and internal logic of the processes, and shall not be construed as any limitation on the implementation processes.

Therefore, according to the foregoing digital person generation method, multiple dimensions of data of a user from multiple data sources is obtained, and the data is processed to generate, based on a digital person model, a digital person including multiple dimensions of user profiles.

The foregoing describes in detail the digital person generation method, and the following is to describe in detail a digital person generation system.

The digital person generation system includes a defining module configured to define a digital person model, where the digital person model includes multiple dimensions of user profile models, an obtaining module configured to obtain multiple dimensions of data of a specific user from multiple data sources, and a generation module configured to process, based on the multiple dimensions of user profile models included in the digital person model defined by the defining module, the multiple dimensions of data of the specific user that is from the multiple data sources and obtained by the obtaining module, to generate multiple dimensions of user profiles corresponding to the specific user, where the multiple dimensions of user profiles of the specific user form a digital person corresponding to the specific user.

Therefore, according to the foregoing digital person generation system, multiple dimensions of data of a user from multiple data sources is obtained, and the data is processed to generate, based on a digital person model, a digital person including multiple dimensions of user profiles.

The obtaining module may include an obtaining unit configured to obtain multiple dimensions of data of multiple users that is from multiple data sources, and a determining unit configured to determine, among the multiple dimensions of data of the multiple users that is from the multiple data sources and obtained by the obtaining unit, and according to a belonging relationship between data and a user, the multiple dimensions of data that is from the multiple data sources and that belongs to the specific user.

The obtaining unit may be further configured to obtain the multiple dimensions of data of the multiple users that is from the multiple data sources using at least one device of a terminal, a communications network element, or a data collection agent.

The multiple dimensions of user profiles include at least two of the following user profiles, such as a user profile in an image dimension, a user profile in a health dimension, a user profile in a behavioural habit dimension, a user profile in a social pattern dimension, a user profile in a consumption habit dimension, and a user profile in an interest and hobby dimension.

The digital person generation system may further include a cleaning module configured to perform data cleaning on the multiple dimensions of data of the specific user that is from the multiple data sources and obtained by the obtaining module, an extraction module configured to extract time and a keyword that are corresponding to content of data obtained by cleaning by the cleaning module, and an annotation module configured to annotate, using the time and the keyword as annotation information, the data obtained by cleaning by the cleaning module.

The determining unit is further configured to process, based on the multiple dimensions of user profile models included in the digital person model defined by the defining module, data obtained after the annotation by the annotation module, to generate the multiple dimensions of user profiles corresponding to the specific user.

The digital person generation system may further include a cleaning module configured to perform data cleaning on the multiple dimensions of data of the specific user that is from the multiple data sources and obtained by the obtaining module, an extraction module configured to extract time, a location, and a keyword that are corresponding to content of data obtained by cleaning by the cleaning module, and an annotation module configured to annotate, using the time, the location, and the keyword as annotation information, the data obtained by cleaning by the cleaning module.

The determining unit is further configured to process, based on the multiple dimensions of user profile models included in the digital person model determined by the determining module, data obtained after the annotation by the annotation module, to generate the multiple dimensions of user profiles corresponding to the specific user.

The digital person generation system may further include a storage module configured to store the data obtained after the annotation.

The digital person generation system may further include a query module configured to provide, to a client and according to a query condition input by the client, a user profile of a digital person corresponding to the query condition.

The digital person generation system may further include a creation module configured to create, according to a requirement of the client, user profile models that are used to generate user profiles and corresponding to the requirement.

Optionally, as an embodiment, the generation module is further configured to process, based on the multiple dimensions of user profile models included in the digital person model determined by the determining module, the multiple dimensions of data of the specific user that is from the multiple data sources using at least one of the following algorithms, to generate the multiple dimensions of user profiles corresponding to the specific user a classification algorithm, a clustering algorithm, a regression algorithm, a reinforcement learning algorithm, a transfer learning algorithm, a deep learning algorithm, or an active learning algorithm.

Therefore, according to the foregoing digital person generation system, multiple dimensions of data of a user from multiple data sources is obtained, and the data is processed to generate, based on a digital person model, a digital person including multiple dimensions of user profiles.

Another digital person generation system may include a receiver, a processor, a memory, and a bus system. The receiver, the processor, and the memory are connected using the bus system. The memory is configured to store an instruction, and the receiver and the processor are configured to execute the instruction stored in the memory. The receiver is configured to obtain multiple dimensions of data of a specific user from multiple data sources.

The processor is configured to define a digital person model, where the digital person model includes multiple dimensions of user profile models, and process, based on the multiple dimensions of user profile models included in the digital person model, the multiple dimensions of data of the specific user that is from the multiple data sources, to generate multiple dimensions of user profiles corresponding to the specific user, where the multiple dimensions of user profiles of the specific user form a digital person corresponding to the specific user.

Therefore, according to the digital person generation system, multiple dimensions of data of a user from multiple data sources is obtained, and the data is processed to generate, based on a digital person model, a digital person including multiple dimensions of user profiles.

It should be understood that the processor may be a Central Processing Unit (CPU), or the processor may be another general purpose processor, a Digital Signal Processor (DSP), an Application Specific Integrated Circuit (ASIC), a Field-Programmable Gate Array (FPGA) or another programmable logic device, a discrete gate or transistor logic device, a discrete hardware assembly, or the like. The general purpose processor may be a microprocessor or the processor may be any conventional processor or the like.

The memory may include a read-only memory (ROM) and a random access memory (RAM) and provide an instruction and data to the processor. A part of the memory may further include a non-volatile random access memory (NVRAM). For example, the memory may further store information about a device type.

In addition to a data bus, the bus system may further include a power bus, a control bus, a status signal bus, and the like. However, for clear description, various types of buses in the figure are marked as the bus system.

In the implementation process, steps of the foregoing method may be completed by an integrated logic circuit of hardware or instructions in a form of software in the processor. Steps of the method disclosed with reference to the embodiments of the present disclosure may be directly executed and completed by means of a hardware processor, or may be executed and completed using a combination of hardware and software modules in the processor. The software module may be located in a mature storage medium in the art, such as a RAM, a flash memory, a ROM, a programmable read-only memory (PROM), an electrically-erasable programmable read-only memory (EEPROM) or a register. The storage medium is located in the memory, and the processor reads the information in the memory and completes the steps of the foregoing method with reference to hardware of the processor. To avoid repetition, details are not described herein.

The receiver may be further configured to obtain multiple dimensions of data of multiple users that is from multiple data sources.

The processor may be further configured to determine, among the multiple dimensions of data of the multiple users that is from the multiple data sources, and according to a belonging relationship between data and a user, the multiple dimensions of data that is from the multiple data sources and that belongs to the specific user.

In addition, the receiver may obtain the multiple dimensions of data of the multiple users that is from the multiple data sources using at least one device of a terminal, a communications network element, or a data collection agent.

Optionally, the multiple dimensions of user profiles include at least two of the user profiles, such as a user profile in an image dimension, a user profile in a health dimension, a user profile in a behavioural habit dimension, a user profile in a social pattern dimension, a user profile in a consumption habit dimension, and a user profile in an interest and hobby dimension.

Optionally, the processor may be further configured to perform data cleaning on the multiple dimensions of data of the specific user that is from the multiple data sources and obtained by the receiver, extract time and a keyword that are corresponding to content of data obtained after the cleaning, and annotate, using the time and the keyword as annotation information, the data obtained after the cleaning.

The processor is further configured to process, based on the multiple dimensions of user profile models included in the digital person model, data obtained after the annotation, to generate the multiple dimensions of user profiles corresponding to the specific user.

Optionally, the processor may be further configured to perform data cleaning on the multiple dimensions of data of the specific user that is from the multiple data sources and obtained by the receiver, extract time, a location, and a keyword that are corresponding to content of data obtained after the cleaning, and annotate, using the time, the location, and the keyword as annotation information, the data obtained after the cleaning.

The processor is further configured to process, based on the multiple dimensions of user profile models included in the digital person model, data obtained after the annotation, to generate the multiple dimensions of user profiles corresponding to the specific user.

Optionally, the memory may be further configured to store the data obtained after the annotation.

Optionally, after the processor generates a digital person, the processor may be further configured to provide, to a client and according to a query condition input by the client, a user profile of a digital person corresponding to the query condition.

Optionally, before the processor defines a digital person model, the processor may be further configured to create, according to a requirement of the client, user profile models that are used to generate user profiles and corresponding to the requirement.

Optionally, that the processor generates a user profile may further include processing, based on the multiple dimensions of user profile models included in the digital person model, the multiple dimensions of data of the specific user that is from the multiple data sources using at least one of the following algorithms, to generate the multiple dimensions of user profiles corresponding to the specific user a classification algorithm, a clustering algorithm, a regression algorithm, a reinforcement learning algorithm, a transfer learning algorithm, a deep learning algorithm, or an active learning algorithm.

Therefore, according to the foregoing digital person generation system, multiple dimensions of data of a user from multiple data sources is obtained, and the data is processed to generate, based on a digital person model, a digital person including multiple dimensions of user profiles.

In addition, a digital world includes multiple data sources. The digital person generation system obtains data from the data sources to generate a digital person, and interacts with the digital world using an API. The digital person generation system may include a receiving module configured to receive multiple dimensions of data of multiple users that is from the multiple data sources, a data pre-processing module configured to determine the users to which the data received by the receiving module belongs, and perform data cleaning and annotation on the data, a data storage module configured to store data obtained after the pre-processing by the data pre-processing module, a user identity management module configured to manage accounts of a user in the multiple data sources, to determine a belonging relationship between the user and the data of the multiple users that is stored in the data storage module, a user profile model configuration library configured to define user profile models used to generate user profiles, an algorithm library configured to store and update multiple algorithms used to generate user profiles, a digital person generation and maintenance module configured to process, based on the user profile models in the user profile model configuration library and according to an algorithm in the algorithm library, the data stored in the data storage module, to generate corresponding user profiles, where the user profiles form a digital person corresponding to the user, and a digital person application programming screen API configured to interact with a client such that the client queries the user profiles of the digital person that is generated by the digital person generation and maintenance module, or accept a requirement raised by a client to create a user profile model.

Therefore, according to the foregoing digital person generation system, multiple dimensions of data of a user from multiple data sources is obtained, and the data is processed to generate, based on a digital person model, a digital person including multiple dimensions of user profiles. In addition, user information, an algorithm library, and a user profile model may be updated and maintained, and the digital person generation system may further interact with a third-party client.

As a basis for the present disclosure, the foregoing describes in detail the digital person generation method and system. The following mainly focuses on describing a map screen determining method and apparatus according to the embodiments of the present disclosure.

First, an architecture that can apply a map screen determining method according to an embodiment of the present disclosure is described in detail. As shown in FIG. 1, a typical architecture for the map screen determining method according to this embodiment of the present disclosure includes a terminal 101, a map system 102, and a digital person management platform 103 (that is, a digital person generation system). Typically, the map system 102 includes BAIDU maps, AUTONAVI maps, GOOGLE maps, and the like. The terminal 101 used by a user uses the map system 102 on a network and sends a map-related instruction to the map system 102. The map system 102 obtains geographic information according to the instruction of the user using a geographic information system (GIS). Moreover, the user further instructs, using the terminal 101, the map system 102 to obtain data about a digital person using a third-party service, for example, the digital person management platform 103. In addition, the map system 102 may further obtain further information using other multiple third-party services. For example, user evaluation information is obtained through Dianping.com, or a telephone number and reservation information are obtained through CTRIP, which is not limited in this embodiment of the present disclosure.

In this embodiment of the present disclosure, the obtained data about the digital person may be further obtained by the terminal 101, in addition to being obtained by the map system 102 shown in FIG. 1. The data about the digital person obtained by the terminal may be stored on the terminal 101, or may be stored on a cloud server associated with the terminal 101 in order to be used by the user at any time, which is not limited in this embodiment of the present disclosure.

FIG. 2 is a schematic flowchart of a map screen determining method 200 according to an embodiment of the present disclosure. The method 200 is executed by a map system or a terminal. The method 200 includes the following steps.

Step S201: Obtain profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources. As described above, the digital person generation system, which may be referred to as a digital person management platform, generates a digital person, and may provide a transaction service to a user using a screen. The user may purchase a digital person or partial profile data of a digital person that is required by the user. The user may select, using a user interface displayed on the terminal and in digital person assets possessed by the user, a target digital person that the user wants to load.

The target digital person may be determined according to a selection operation of the user, or may be defaulted by a map system, map software or a map application on the terminal, or the like (for example, the user selected a target digital person when using a map system/application last time. In this case, when the user uses the map system/ application again, the map system/application defaults to still loading, on a map screen, profile data in a track dimension of the target digital person). If the map system obtains profile data of a digital person, the terminal instructs, using a network, to send to the map system an identifier indicating a target digital person, and the map system obtains, using the digital person generation system or a corresponding third-party service platform, profile data in a track dimension of a target digital person corresponding to the identifier. If the terminal obtains profile data of a digital person, the terminal obtains profile data in a track dimension of a target digital person stored on the terminal, or the terminal obtains profile data in a track dimension of a target digital person using a cloud server associated with the terminal.

It should be understood that the digital person generation system may generate various dimensions of profiles of a digital person corresponding to an individual in the physical world, such as a profile in an image dimension, a profile in a health dimension, a profile in a behavioral habit dimension, a profile in a social pattern dimension, a profile in a consumption pattern dimension, and a profile in an interest and hobby dimension, and therefore, may also generate a profile in a track dimension. The profile in the track dimension may include data, as shown in Table 3, such as an activity type (an exercise, catering, shopping, leisure, or the like), a place (coordinates of a geographic location or a place name), a time segment (forenoon/afternoon/evening or a workday/holiday), a frequency (XX times/per day, XX times/per week, XX times/per month, or XX times/per year), and partner information (alone, a colleague, a family, or a friend). The profile in the track dimension herein may correspond to the profile data in the track dimension in this embodiment of the present disclosure, and include information related to a track dimension of a digital person. In addition to including the track-related information, listed in Table 3, of the digital person at a place, the profile data in the track dimension may further include a path along which the digital person passes from the place to arrive at another place, and the like, and no limitation is imposed on content included in the profile data in the track dimension in this embodiment of the present disclosure.

TABLE 3

| Activity type | Place | Time segment. | Frequency | Partner information |
|---|---|---|---|---|
| [Exercise, catering, shopping, leisure, or the like] | [Coordinates of a geographic location or a place name] | [Forenoon/ afternoon/ evening, or a workday/ holiday] | XX times/per day, XX times/per week, XX times/per month, or XX times/per year | alone, a colleague, a family, or a friend |

In addition, besides the profile data in the track dimension of the target digital person, other information of the digital person may be further obtained, for example, personal background information of the digital person that includes basic information of the digital person such as gender, age, level of education, profession, industry, salary level, nationality, region (place of residence, growth place/birthplace), used language (Chinese, English, . . . ), feature tag (mother, couple, . . . ) of the target digital person.

Step S202: Determine map data of a target area, where the target area is a specific map area that needs to be presented to a user. Further, when using a map service, the user continually sends instructions to the map system, and the map system or terminal may obtain, from the user, the instructions related to a map, for example, searching for an address, adjusting area coverage displayed on the map, and searching for a path from a place to another place. The interactive operations performed between the user and the map system are sent to the map system in a form of instructions, commands, or requests, and the map system provides feedbacks, to present a specific map area to the user. In addition, the user may also make an interactive request to map software or a map application of the terminal, which is not limited in this embodiment of the present disclosure. A corresponding target area is determined by the map system, the map software or map application of the terminal, or the like according to a user instruction. The target area corresponds to corresponding map data, including a place, a path (an instruction sent by the user may be searching for a path between two places), and the like on the map.

It should be understood that the target area may also default in the map system, the map software or map application of the terminal, or the like. For example, when the user opens the map system, or the map software or map application of the terminal, the map system/application presents a default map area to the user, or presents, to the user, a map area on which the user retained when the user used the map system/application last time. In this case, the map area is the target area.

Step S203: Determine a tracing map screen according to the profile data in the track dimension of the target digital person and the map data, where the tracing map screen represents a track feature of the target digital person in the target area. The map system, the map software or map application of the terminal, or the like converts nonstandard profile data in a track dimension of the target digital person to data available for the map system, the map software or map application of the terminal, or the like. Data, related to the place or path included in the target area determined in step S202, in the profile data in the track dimension is extracted and is processed together with the map data in order to form the tracing map screen on which the profile data in the track dimension of the target digital person is loaded such that the track feature of the target digital person in the target area is presented to the user.

Further, the converting nonstandard profile data in a track dimension of the target digital person to data available for the map system, the map software or map application of the terminal, or the like may be converting "place" information to vector location information of a place on the map, converting "frequency" information to a thermodynamic diagram or a visual element and presenting the thermodynamic diagram or the visual element at a location of a corresponding place on the map, converting "activity type" information, "time segment" information, and "partner" information to an operable screen/filter option (similar to a function of sorting based on prices, evaluation, services, or the like on the map), or the like.

The tracing map screen on which the profile data in the track dimension of the target digital person is loaded may display, according to levels, according to a frequency at which the target digital person occurs, and at a place included in the target area determined on the map screen, or display, in different manners and according to data about the target digital person, paths that are between two places and for which the user searches, which is not limited in this embodiment of the present disclosure. In addition, some widgets assisting in operations, for example, a digital person display widget indicating that profile data of a digital person is loaded, may be further presented to the user, which is not limited in this embodiment of the present disclosure.

Therefore, according to the map screen determining method in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

Optionally, in this embodiment of the present disclosure, before the obtaining profile data in a track dimension of a target digital person, the method 200 further includes presenting a digital person display widget to the user, where the digital person display widget is in a first state, and the first state indicates that no profile data in a track dimension of a digital person is loaded on a current map screen, obtaining a first operation action performed by the user on the digital person display widget in the first state, presenting a digital person selection widget to the user according to the first operation action, where the digital person selection widget includes multiple digital person objects available for loading, and determining, as the target digital person, a digital person corresponding to a digital person object selected by the user.

After determining a tracing map screen according to the profile data in the track dimension of the target digital person and the map data, the method 200 further includes presenting the tracing map screen to the user, and presenting a second state of the digital person display widget to the user, where the second state indicates that the profile data in the track dimension of the target digital person is loaded on the current map screen.

Figure 3B:
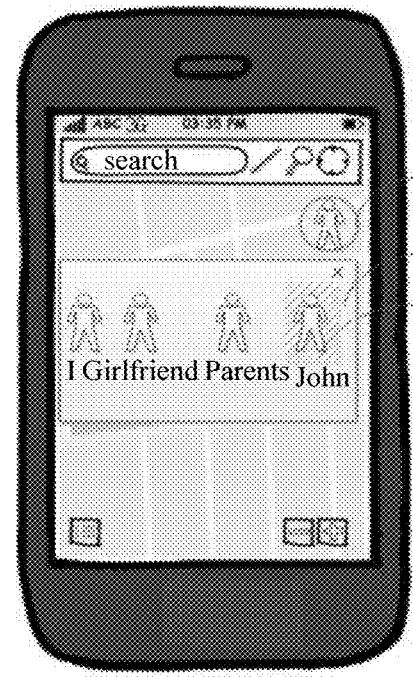
Figure 3C:
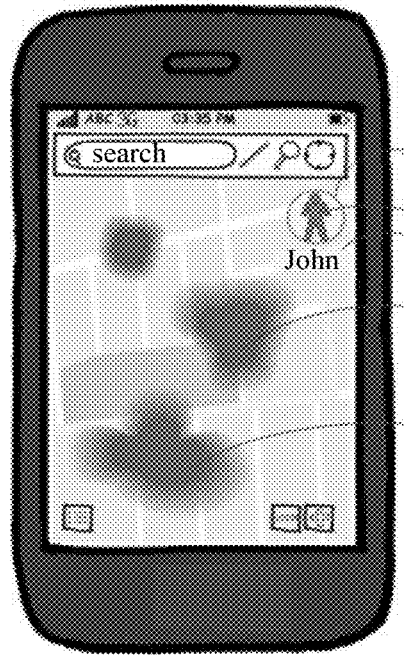

Further, as shown in FIG. 3A, FIG. 3B and FIG. 3C, a digital person display widget 310 may be presented to the user, to display a digital person loading status and facilitate the user in performing related operations of digital person selection and loading. For example, the digital person display widget 310 is controlled to be in a different state using a different visual element. For example, it indicates that no profile data in a track dimension of a digital person is loaded on the current map screen when the digital person display widget 310 is in the first state, and it may indicate that profile data in a track dimension of a digital person, a name of a digital person, or the like is currently loaded when the digital person display widget 310 is in the second state. A visual element that controls the digital person display widget 310 to be in a different state may be an element such as a hue, transparency, brightness, or the like.

In an optional implementation manner, elements 311 in FIG. 3A to FIG. 3C are provided. An icon 311 shown in FIG. 3A is hollow, which indicates that no digital person is loaded. An icon shown in FIG. 3C is solid, which indicates that a digital person is loaded, and a name of the digital person is displayed on the digital person display widget, to distinguish different digital persons. The name of the digital person may be a default name stored on the digital person management platform, or may be named by the user. In addition, the entire name of the digital person may be displayed. A limited quantity of characters may be displayed when the name of the digital person is excessively long. For example, three characters and " . . . " are displayed. For example, when the name of the currently loaded digital person is "white collar and petty bourgeois," "white collar and . . . " may be displayed on the map screen.

The user performs the first operation action on the digital person display widget, and a digital person may be loaded from a digital person resource currently possessed by the user. The operation action may be a gesture made by the user on a touchscreen terminal, or may be a voice instruction of the user or an instruction made by the user to a terminal using a mouse, keyboard, or the like. The digital person selection widget is presented to the user according to the first operation action, where the digital person selection widget includes multiple digital person objects available for loading. The user selects a digital person object corresponding to a digital person that the user wants to load. For example, on a terminal with a touchscreen, the user may directly tap a digital person object that the user wants to load, and on another terminal, the user may directly drag a digital person object to a map, which is not limited in this embodiment of the present disclosure. The digital person object may be an icon, text, a file, a folder, or the like corresponding to the digital person, which is not limited in this embodiment of the present disclosure.

The digital person corresponding to the digital person object selected by the user is determined as the target digital person, and then the profile data in the track dimension of the target digital person may be obtained. Obtaining the profile data in the track dimension of the target digital person may be receiving an instruction from the terminal by the map system and obtaining the profile data from the digital person generation system, the third-party digital person management platform, or the like, or may be obtaining, by the terminal, related data of the target digital person from a digital person storage module of the terminal, or requesting related data of the target digital person from the cloud server associated with the terminal, and no limitation is imposed on a specific obtaining manner in this embodiment of the present disclosure.

In an example, as shown in FIG. 3B, the user taps the digital person display widget 310, and a digital person selection widget 320 is displayed on a screen, where the digital person selection widget 320 includes digital person objects corresponding to multiple digital person assets possessed by the user. The user determines a to-be-selected digital person by selecting a digital person object. Then, the terminal or the map system may request the profile data in the track dimension of the target digital person from the digital person management platform, the digital person storage module, or the cloud server associated with the terminal, receive the profile data in the track dimension of the target digital person sent by the digital person management platform, the digital person storage module, or the cloud server associated with the terminal, match the profile data in the track dimension of the target digital person with a place, a path, or the like in a current map area, perform data processing, that is, perform corresponding processing on the profile data in the track dimension of the target digital person and the map data, and determine the tracing map screen on which the profile data in the track dimension of the target digital person is loaded.

For example, as shown in FIG. 3B, the user selects a digital person 321 whose name is "John," that is, the target digital person using the digital person selection widget. In this case, the map system, or the map software or map application of the terminal obtains profile data in a track dimension of the digital person "John," processes the profile data in the track dimension of the digital person "John" and the map data, and determines a tracing map screen on which the data about the digital person "John" is loaded, where the tracing map screen may indicate a track feature of the digital person "John" in a target area.

FIG. 3C shows the tracing map screen on which the data about the digital person "John" 312 is loaded, where thermodynamic diagrams shown by 331 and 332 corresponding to frequencies at which the digital person "John" appears in target areas are displayed on the tracing map screen. The thermodynamic diagram is also referred to as a heat map, may prompt different frequencies according to shades of colors or different hues of the thermodynamic diagram in this embodiment of the present disclosure, and may apply when a map is zoomed in by a relatively small degree. Generally, a darker color indicates a higher frequency. In this embodiment of the present disclosure, the frequency is calculated according to a frequency at which a physical human corresponding to the data about the digital person appears at the places.

Correspondingly, determining a tracing map screen according to the profile data in the track dimension of the target digital person and the map data includes determining, according to the profile data in the track dimension of the target digital person in the target area, a frequency at which the target digital person appears at a place in the target area, generating, according to the frequency at which the target digital person appears at the place in the target area, a visual element used to represent the frequency at which the target digital person appears at the place in the target area, where the visual element is used to represent the track feature of the target digital person in the target area, and determining a map screen including the visual element as the tracing map screen.

Optionally, the visual element may be a thermodynamic diagram corresponding to the frequency at which the target digital person appears at the place in the target area. FIG. 3A, FIG. 3B and FIG. 3C shows an example of thermodynamic diagrams corresponding to frequencies at which the target digital person appears at places in the target area.

Optionally, the visual element may further include at least two different identifiers corresponding to the frequency at which the target digital person appears at the place in the target area.

Further, when the map is zoomed in to a specific degree, details of each place can be displayed on the map. For a tracing map screen on which profile data in a track dimension of a digital person is loaded, a frequency at which the digital person appears at a place in a map area may be determined according to the loaded profile data in a track dimension of the digital person, where different identifiers are separately used to represent frequencies at places in the map area. After the map is zoomed in to a specific degree, a prompt for the frequency may be used when a type of places are searched or when a specific place is searched for. In this embodiment of the present disclosure, an identifier prompts the user with a frequency at which a current digital person appears and that is corresponding to each place. The identifier may be changing transparency, a color, a hue, a size, a shape, brightness, or the like of an icon, text, or the like, and may be a visual representation means for prompting a level or degree. For example, a target place is a place to which a currently loaded digital person goes most frequently, a second place is a place to which the currently loaded digital person goes occasionally, and a third place is a place to which the currently loaded digital person goes scarcely. A possible representation includes that a red icon is used for the target place, an orange icon is used for the second place, and a hollow (only an outline of an icon, colorless) icon is used for the third place. Multiple identifiers such as transparency, a hue, a size, a shape, or brightness may be used together. For example, a size of the icon for the third place is less than those of icons for the target place and for the second place. In this embodiment of the present disclosure, there are at least two levels of frequency ranges, and more detailed levels may also be provided.

A correspondence between a frequency and an identifier may be preset. For example, three levels of identifiers (that is, three identifiers) may be set for a restaurant, where a highest frequency corresponds to more than three times a week, a next highest frequency corresponds to more than three times a month, and a lowest frequency corresponds to less than three times a year. Different corresponding rules may be set for places with different activity types. For example, a correspondence for a leisure place such as a park may be that a highest frequency corresponds to more than three times a month, a next highest frequency corresponds to more than five times a year, and a lowest frequency corresponds to less than once a year, or the like.

Figure 4:
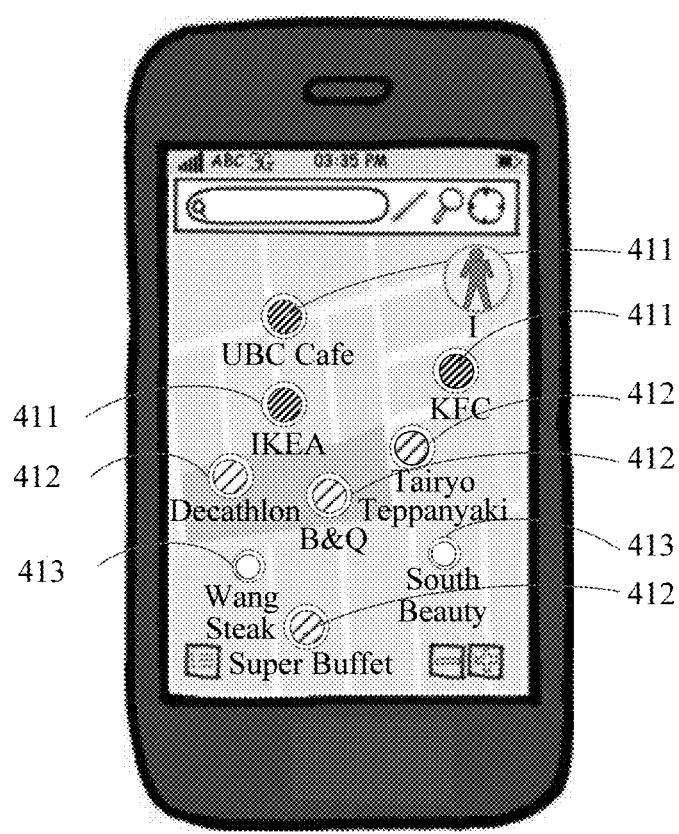
FIG. 4 is a schematic diagram of a map screen determining method according to an embodiment of the present disclosure.

As shown in FIG. 4, a digital person that is currently loaded on the map screen is "I," where "I" represents a user group whose feature is "monthly salary of 4000 to 10000 Renminbi (RMB), and graduates." It can be seen, from FIG. 4, that the digital person goes to places 411 such as UBC Cafe, KFC, and IKEA most frequently, goes to places 412 such as Decathlon, B&Q, Tairyo Teppanyaki, and Super Buffet at a relatively low frequency, and goes to places 413 such as SOUTH BEAUTY and WANG STEAK least frequently.

Optionally, in this embodiment of the present disclosure, a legend used to indicate a correspondence between an identifier and a frequency may be further displayed on the tracing map screen. For example, a visual element of type 411 corresponds to a frequency, more than 10 times, at which the digital person appears at the place, a visual element of type 412 corresponds to a frequency, three to nine times, at which the digital person appears at the place, and a visual element of type 413 corresponds to a frequency, less than three times at which the digital person appears at the place. The foregoing correspondence may be marked on the tracing map screen using a legend.

Figure 5:
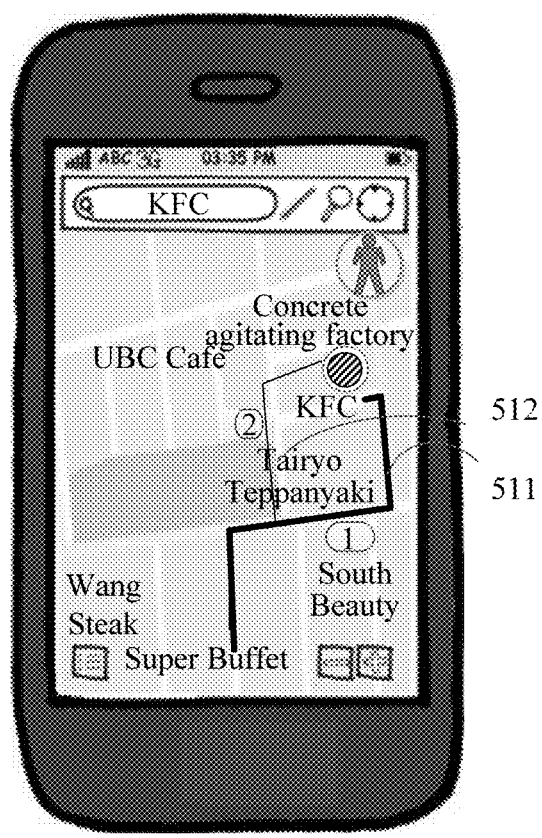
FIG. 5 is a schematic diagram of a map screen determining method according to an embodiment of the present disclosure.

Optionally, in this embodiment of the present disclosure, when paths between two places are displayed within the target area, if the loaded digital person provides a recommended path among the paths between the two places, the recommended path may be represented using a visual element different from those of the other paths. A used means is similar to a means for prompting a specific place. According to a feature of the information "path," the used visual element may be a line width, a line type, a color, or the like, or may be marked near a path using a sequence number, for example, 1 is an optimal path, and 2, 3, . . . are gradually less optimal. For example, in FIG. 5, a current digital person reaches a place KFC more frequently along a path 511 that is identified using a line whose width is greater, and less frequently along a path 512 that is identified using a line whose width is smaller. Further, in actual life, there are generally some more proper routes or shortcuts used by people familiar with the surroundings. A user can easily know the routes or shortcuts by loading a digital person whose feature is "resident near a concrete agitating factory." As shown in FIG. 5, the user can learn that a person who is relatively familiar with the area selects the path 512.

Therefore, according to the map screen determining method in this embodiment of the present disclosure, a user may load a digital person using a digital person display widget, and correspondingly process and display a to-be-displayed map screen using a visual element. Different visual elements are used to distinguish frequencies at which a currently loaded digital person appears at various places or paths on which a currently loaded digital person walks, which can help the user make a decision more quickly and more accurately, and facilitate map search and usage for the user.

Optionally, as an embodiment, the map screen determining method 200 further includes obtaining a second operation action performed by the user on the digital person display widget in the second state, determining personal background information of the target digital person according to the second operation action, and presenting a digital person information widget to the user, where the digital person information widget includes the personal background information of the target digital person.

Figure 6A:
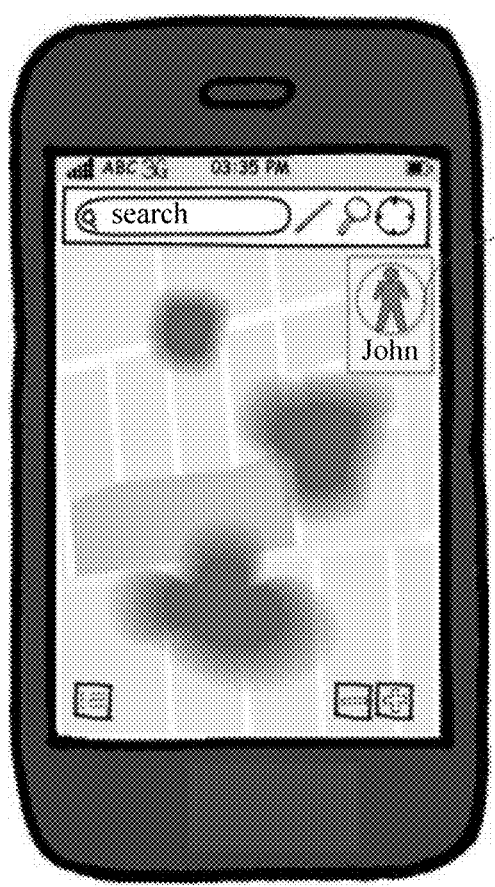
FIG. 6A and FIG. 6B are a schematic diagram of a map screen determining method according to an embodiment of the present disclosure.

Further, as shown in FIG. 6A, the user can perform the second operation action on the digital person display widget 610 in the second state, that is, the digital person display widget 610 indicating that the target digital person has been loaded, for example, touching and holding the digital person display widget 610, double tapping the digital person display widget 610, or firmly pressing the digital person display widget 610 on a touchscreen with a pressure sensing function. The screen or a display device obtains the second operation action, and determines, according to a preset operation action semantics, that semantics of the second operation action is displaying personal background information of the currently loaded digital person. The map system or the map software or map application of the terminal determines personal background information of the target digital person according to the semantics of the second operation action. The personal background information may include basic information of the digital person such as gender, age, level of education, profession, industry, salary level, nationality, region (place of residence, growth place/birthplace), used language (Chinese, English, . . . ), feature tag (mother, couple, . . . ) of the target digital person.

Figure 6B:

In an example of FIG. 6A, information about the digital person "John" includes name, gender, age, nationality, working unit, salary level, and the like. It should be understood that in this embodiment of the present disclosure, if the target digital person does not correspond to an individual in the physical world, but correspond to a type of people, the information about the target digital person may include related information of common features of the type of people. In FIG. 6B, a digital person information widget 620 is presented to the user, where the digital person information widget 620 includes the information about the digital person "John."

Therefore, according to the map screen determining method in this embodiment of the present disclosure, information about a digital person may be displayed on a tracing map screen. In this case, it is convenient for a user to gain a general knowledge of basic information of the digital person and make a more proper decision with reference to a map.

Optionally, as an embodiment, the map screen determining method 200 further includes obtaining a third operation action performed by the user on a target place on the tracing map screen, and presenting a target place information widget to the user according to the third operation action, where the target place information widget includes statistical information, related to the target place, of the digital person.

Figure 7A:
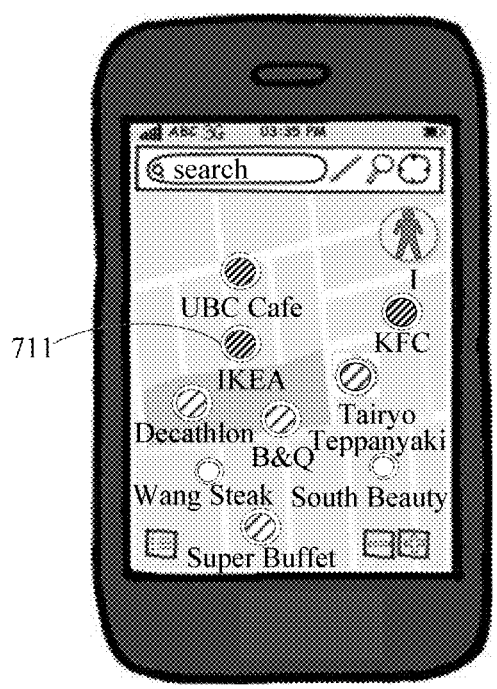
FIG. 7A, FIG. 7B, FIG. 7C and FIG. 7D are a schematic diagram of a map screen determining method according to an embodiment of the present disclosure.
Figure 7B:
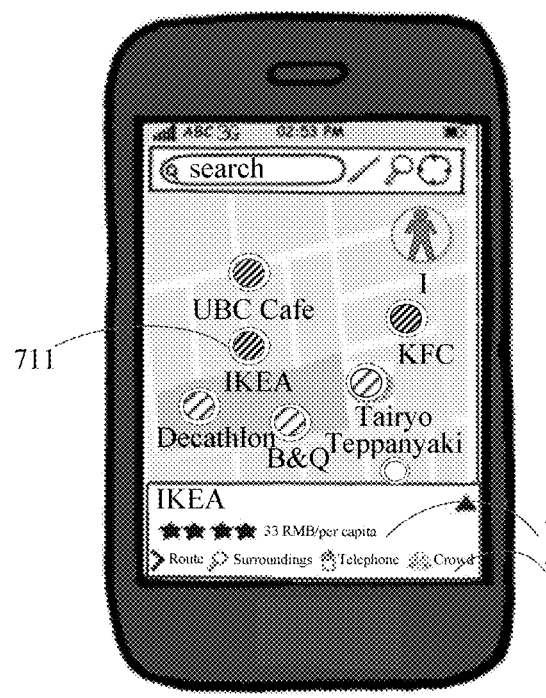
Figure 7C:
Figure 7D:
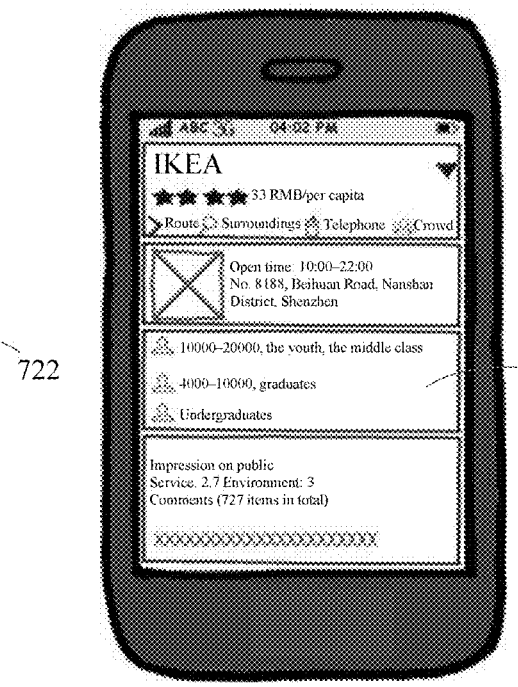

Further, when selecting a specific place, the user performs the third operation action, such as tap, touch and hold, double tap, or firm press, on the target place on the tracing map screen, and detailed information of the target place can be displayed on the map screen. The detailed information includes statistical information, related to the target place, of the digital person, for example, information about a user group. As shown in FIG. 7A, the user selects a place IKEA 711, and a target place information widget, that is, an IKEA information widget 720 shown in FIG. 7B, is presented to the user by tapping or double tapping a visual element 711. The IKEA information widget 720 may include an amount of consumption per capita, a telephone number, a route, surroundings, or the like, and may further display an item "Crowd" 721 in FIG. 7B. Detailed content of the foregoing items shown in FIG. 7C can be viewed by tapping an expansion button in the IKEA information widget 720. Content of the "Crowd" is shown by 722 in FIG. 7C. It can be learnt, from the content 722 of the "Crowd," that digital persons who appear most frequently at the place are "10000 to 20000 RMB, the youth, and the middle class," which indirectly indicates that users with these features are most appropriate consumption crowds for the place. Other crowds who patronize IKEA can be further viewed by tapping an expansion button in 722 in FIG. 7D, for example, "4000 to 10000 RMB and graduates" and "undergraduates." Preferably, different types of user groups in the "Crowd" can be sorted according to appearance frequencies.

Therefore, according to the map screen determining method in this embodiment of the present disclosure, statistical information, corresponding to a place selected by a user, of a digital person may be displayed, which can provide comprehensive information to the user.

Optionally, in this embodiment of the present disclosure, the map screen determining method 200 further includes obtaining a fourth operation action performed by the user on the digital person display widget in the second state, presenting a digital person selection widget to the user according to the fourth operation action, where the digital person selection widget includes multiple digital person objects available for loading, determining, as the target digital person, a digital person corresponding to a digital person object selected by the user, obtaining profile data in a track dimension of the target digital person, determining a tracing map screen according to the profile data in the track dimension of the target digital person and the map data, where the tracing map screen represents a track feature of the target digital person in the target area, and presenting the tracing map screen to the user.

Figure 8A:
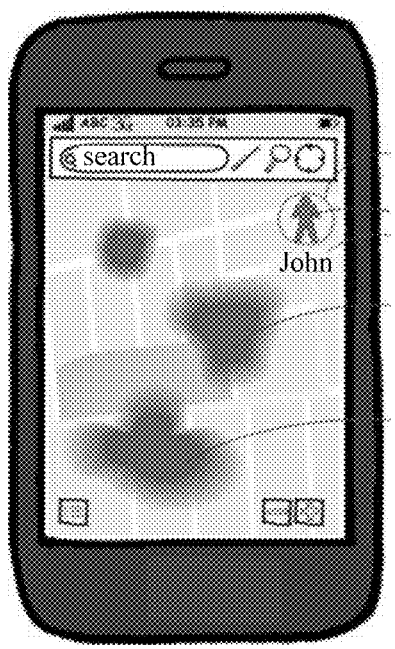
FIG. 8A, FIG. 8B and FIG. 8C are a schematic diagram of a map screen determining method according to an embodiment of the present disclosure.
Figure 8B:
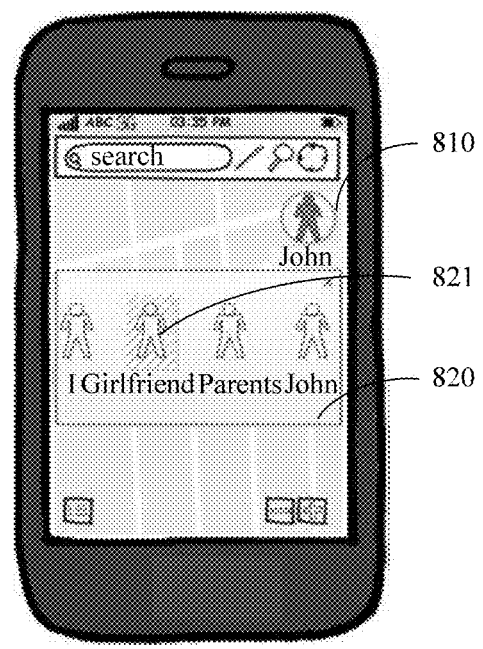
Figure 8C:
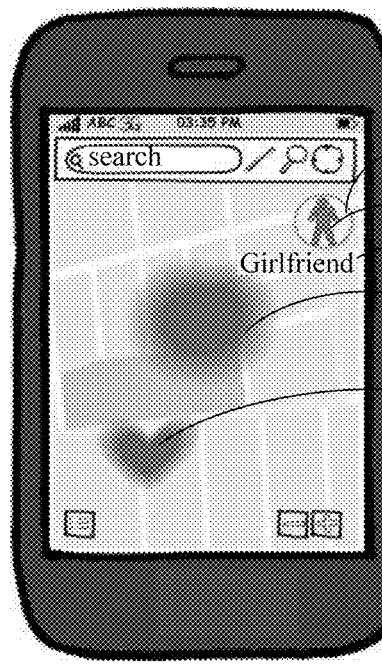

Further, if possessing multiple digital person assets, the user can further perform digital person switching on the map screen. As shown in FIG. 8A, a digital person that is loaded on a current map screen is a first digital person "John." A center 811 of a digital person display widget 810 is displayed in a solid way, and a digital person name 812 below is displayed as "John". Thermodynamic diagrams 831 and 832 of the first digital person "John" in a target area are presented on the map screen. The user performs a fourth operation action, for example, tap, on the digital person display widget 810. In FIG. 8B, the screen or a display device obtains the fourth operation action and determines, according to a preset operation action semantics, that semantics of the fourth operation action is digital person switching. In this case, a digital person selection widget 820 is presented to the user on the map screen, where the digital person selection widget includes corresponding identifiers of multiple digital persons available for loading. For example, as shown in FIG. 8B, the user totally possesses four digital persons, and besides "John," optional digital persons are "I," "Girlfriend," and "Parents." A second digital person selected by the user is determined, for example, the digital person "Girlfriend" 821 is selected by the user, and profile data in a track dimension of the digital person "Girlfriend" is obtained. Corresponding processing is performed on the profile data in the track dimension of the digital person "Girlfriend" and the map data, and a map screen on which the profile data in the track dimension of the digital person "Girlfriend" is loaded is determined. As shown in FIG. 8C, the map screen on which the data about the digital person "Girlfriend" is loaded and displayed on the screen. A digital person name displayed below the digital person display widget 810 on the map screen is changed to the "Girlfriend" 813, and the thermodynamic diagrams, displayed on the map screen, corresponding to the frequencies at which "John" appears in the target area are changed to thermodynamic diagrams 833 and 834 corresponding to frequencies at which the "Girlfriend" appears in the area on the map screen.

Therefore, according to the map screen determining method in this embodiment of the present disclosure, switching can be performed between different digital persons, which can provide, to a user, personalized map services suitable for different people or crowds.

Figure 9:
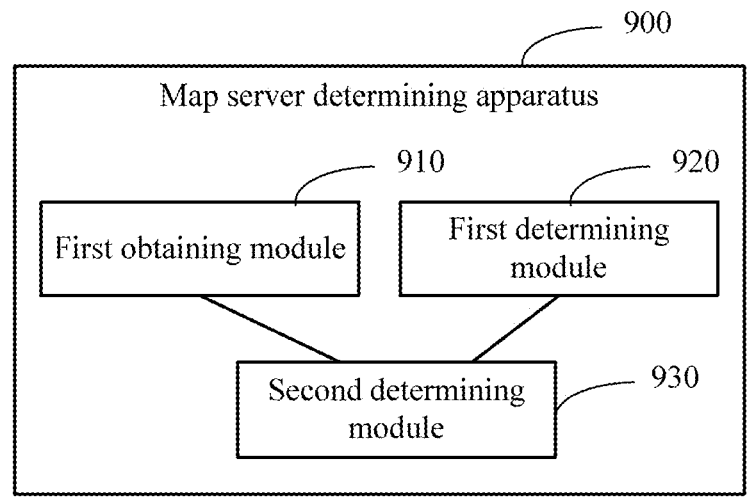
FIG. 9 is a schematic block diagram of a map screen determining apparatus according to an embodiment of the present disclosure.

The foregoing describes, with reference to FIG. 1 to FIG. 8C, in detail the map screen determining method according to this embodiment of the present disclosure. The following describes, with reference to FIG. 9 to FIG. 12, in detail a map screen determining apparatus according to embodiments of the present disclosure FIG. 9 is a schematic block diagram of a map screen determining apparatus 900 according to an embodiment of the present disclosure. As shown in FIG. 9, the apparatus 900 includes a first obtaining module 910 configured to obtain profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources, a first determining module 920 configured to determine map data of a target area, where the target area is a specific map area that needs to be presented to a user, and a second determining module 930 configured to determine a tracing map screen according to the profile data in the track dimension of the target digital person obtained by the first obtaining module 910 and the map data determined by the first determining module 920, where the tracing map screen represents a track feature of the target digital person in the target area.

Therefore, according to the map screen determining apparatus in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

Optionally, as an embodiment, the second determining module 930 is further configured to determine, according to the profile data in the track dimension of the target digital person in the target area, a frequency at which the target digital person appears at a place in the target area, generate, according to the frequency at which the target digital person appears at the place in the target area, a visual element used to represent the frequency at which the target digital person appears at the place in the target area, where the visual element represents the track feature of the target digital person in the target area, and determine a map screen including the visual element as the tracing map screen.

Optionally, the visual element is a thermodynamic diagram corresponding to the frequency at which the target digital person appears at the place in the target area.

Optionally, the visual element includes at least two different identifiers corresponding to the frequency at which the target digital person appears at the place in the target area.

Optionally, the map screen further includes a legend used to indicate a correspondence between the identifiers and the frequency.

Optionally, as an embodiment, the apparatus 900 further includes a presentation module (not shown) configured to present a digital person display widget to the user, where the digital person display widget is in a first state, and the first state indicates that no profile data in a track dimension of a digital person is loaded on a current map screen, and a second obtaining module (not shown) configured to obtain a first operation action performed by the user on the digital person display widget presented by the presentation module.

The presentation module is further configured to present a digital person selection widget to the user according to the first operation action obtained by the second obtaining module, where the digital person selection widget includes multiple digital person objects available for loading.

The apparatus 900 further includes a third determining module (not shown) configured to determine, as the target digital person, a digital person corresponding to a digital person object selected by the user. The presentation module is further configured to present the tracing map screen to the user, and present a second state of the digital person display widget to the user after the second determining module 930 determines the tracing map screen according to the profile data in the track dimension of the target digital person and the map data, where the second state indicates that the profile data in the track dimension of the target digital person is loaded on the current map screen.

Optionally, as an embodiment, the apparatus 900 further includes a third obtaining module (not shown) configured to obtain a second operation action performed by the user on the digital person display widget in the second state, and a fourth determining module (not shown) configured to determine personal background information of the target digital person according to the second operation action obtained by the third obtaining module.

The presentation module is further configured to present a digital person information widget to the user, where the digital person information widget includes the personal background information, of the target digital person, determined by the fourth determining module.

Optionally, as an embodiment, the apparatus 900 further includes a fourth obtaining module (not shown) configured to obtain a third operation action performed by the user on a target place on the tracing map screen.

The presentation module is further configured to present a target place information widget to the user according to the third operation action obtained by the fourth obtaining module, where the target place information widget includes statistical information, related to the target place, of the digital person.

Optionally, the apparatus 900 is a terminal.

Therefore, according to the map screen determining apparatus 900 in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

Figure 10:
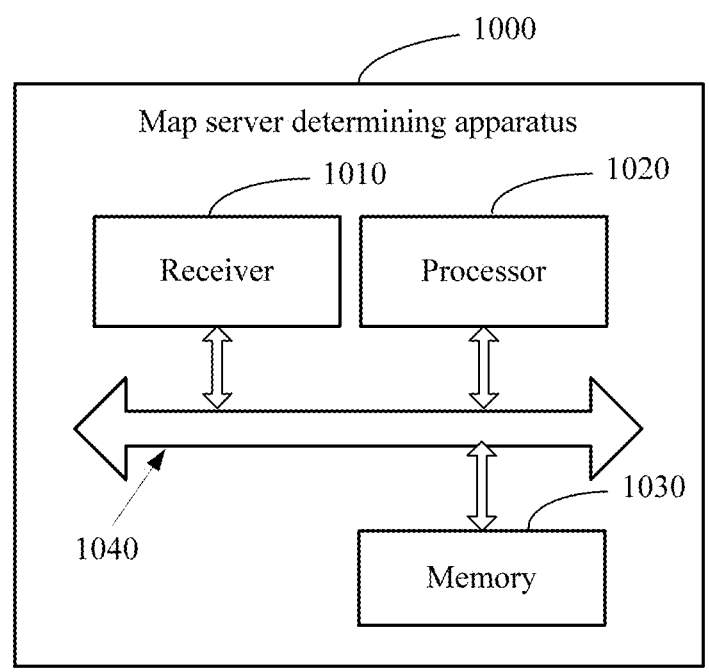
FIG. 10 is a schematic block diagram of a map screen determining apparatus according to an embodiment of the present disclosure.

As shown in FIG. 10, an embodiment of the present disclosure further provides a map server determining apparatus 1000. The apparatus 1000 includes a receiver 1010, a processor 1020, a memory 1030, and a bus system 1040. The receiver 1010, the processor 1020, and the memory 1030 are connected using the bus system 1040. The memory 1030 is configured to store an instruction. The receiver 1010 and the processor 1020 are configured to execute the instruction stored by the memory 1030. The receiver 1010 is configured to obtain profile data in a track dimension of a target digital person, where the target digital person is generated by a digital person generation system, the target digital person includes multiple dimensions of target user profiles corresponding to a target user, and the target user profiles are generated by processing multiple dimensions of data from multiple data sources.

The processor 1020 is configured to determine map data of a target area, where the target area is a specific map area that needs to be presented to a user, and determine a tracing map screen according to the profile data in the track dimension of the target digital person and the map data, where the tracing map screen represents a track feature of the target digital person in the target area.

Therefore, according to the map screen determining apparatus in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

It should be understood that in this embodiment of the present disclosure, the processor 1020 may be a CPU, or the processor 1020 may be another general purpose processor, a DSP, an ASIC, a FPGA or another programmable logic device, a discrete gate or transistor logic device, a discrete hardware assembly, or the like. A general purpose processor may be a microprocessor or the processor 1020 may be any conventional processor or the like.

The memory 1030 may include a ROM and a RAM and provide an instruction and data to the processor 1020. A part of the memory 1030 may further include an NVRAM. For example, the memory 1030 may further store information about a device type.

In addition to a data bus, the bus system 1040 may further include a power bus, a control bus, a status signal bus, and the like. However, for clear description, various types of buses in the figure are marked as the bus system 1040.

In the implementation process, steps of the foregoing method may be completed by an integrated logic circuit of hardware or instructions in a form of software in the processor 1020. Steps of the method disclosed with reference to this embodiment of the present disclosure may be directly executed and completed by means of a hardware processor, or may be executed and completed using a combination of hardware and software modules in the processor. The software module may be located in a mature storage medium in the art, such as a RAM, a flash memory, a ROM, a PROM, an EEPROM or a register. The storage medium is located in the memory 1030, and the processor 1020 reads the information in the memory 1030 and completes the steps of the foregoing method with reference to hardware of the processor. To avoid repetition, details are not described herein.

Optionally, as an embodiment, the processor 1020 may be configured to determine, according to the profile data in the track dimension of the target digital person in the target area, a frequency at which the target digital person appears at a place in the target area, generate, according to the frequency at which the target digital person appears at the place in the target area, a visual element used to represent the frequency at which the target digital person appears at the place in the target area, where the visual element represents the track feature of the target digital person in the target area, and determine a map screen including the visual element as the tracing map screen.

Optionally, as an embodiment, the visual element is a thermodynamic diagram corresponding to the frequency at which the target digital person appears at the place in the target area.

Optionally, as an embodiment, the visual element includes at least two different identifiers corresponding to the frequency at which the target digital person appears at the place in the target area.

Optionally, as an embodiment, the map screen further includes a legend indicating a correspondence between the identifiers and the frequency.

Optionally, as an embodiment, the processor 1020 may be further configured to present a digital person display widget to the user, where the digital person display widget is in a first state, and the first state indicates that no profile data in a track dimension of a digital person is loaded on a current map screen, obtain a first operation action performed by the user on the digital person display widget in the first state, present a digital person selection widget to the user according to the first operation action, where the digital person selection widget includes multiple digital person objects available for loading, and determine, as the target digital person, a digital person corresponding to a digital person object selected by the user.

The processor 1020 is further configured to present the tracing map screen to the user, and present a second state of the digital person display widget to the user, where the second state indicates that the profile data in the track dimension of the target digital person is loaded on the current map screen.

Optionally, as an embodiment, the processor 1020 may be further configured to obtain a second operation action performed by the user on the digital person display widget in the second state, determine personal background information of the target digital person according to the second operation action, and present a digital person information widget to the user, where the digital person information widget includes the personal background information of the target digital person.

Optionally, as an embodiment, the processor 1020 may be further configured to obtain a third operation action performed by the user on a target place on the tracing map screen, and present a target place information widget to the user according to the third operation action, where the target place information widget includes statistical information, related to the target place, of the digital person.

It should be understood that, the map screen determining apparatus 1000 according to this embodiment of the present disclosure may correspond to an entity for executing the method in the embodiment of the present disclosure, and may further correspond to the map screen determining apparatus 900 in the embodiment of the present disclosure. In addition, the foregoing and other operations and/or functions of the modules of the apparatus 1000 are for implementing corresponding procedures of the method in FIG. 1 to FIG. 8C, and for ease of conciseness, no details are repeated herein.

Therefore, according to the map screen determining apparatus in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

Figure 11:
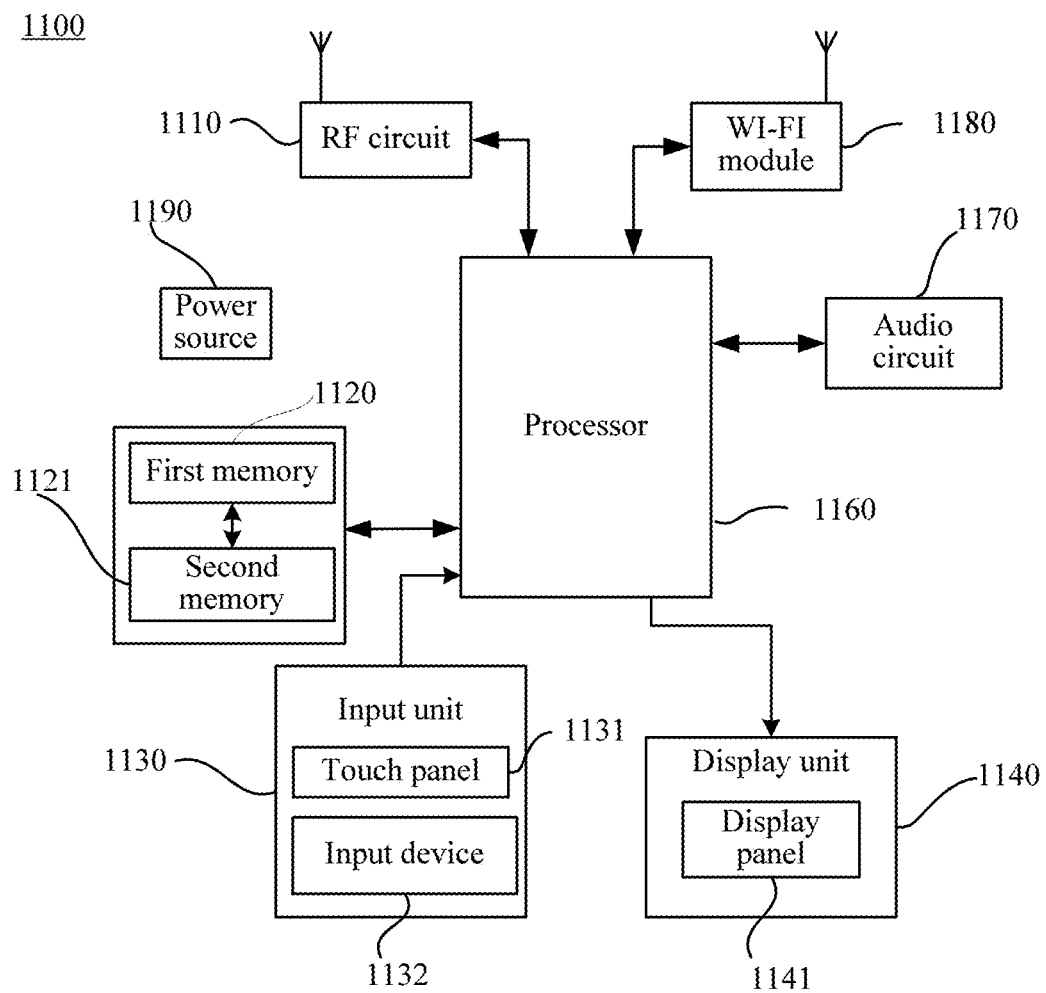
FIG. 11 is a schematic block diagram of a terminal according to an embodiment of the present disclosure.

FIG. 11 is a schematic structural diagram of a terminal 1100 according to an embodiment of the present disclosure. An embodiment of the present disclosure relates to the terminal device 1100 and a map screen determining method. The terminal device 1100 may be a mobile phone, a tablet computer, a Personal Digital Assistant (PDA) a Point of Sales (POS), a vehicle-mounted computer, or the like.

Referring to FIG. 11, the terminal 1100 in this embodiment of the present disclosure includes a first memory 1120, a processor 1160, and an input unit 1130. The first memory 1120 stores a preset quantity of pieces of screen information of an application of the terminal 1100, where the screen information includes a screen element, a screen number, a correspondence between the screen number and the screen element, and information about a location of the screen element on an application screen that corresponds to the screen number. The input unit 1130 is configured to receive an operation of switching an application screen by a user, and generate a switch signal. The processor 1160 is configured to determine a target screen number according to the switch signal, determine, according to a predetermined quantity adjacent to the target screen number, a screen number adjacent to the target screen number, determine, according to the screen number stored in the first memory 1120 and the screen number adjacent to the target screen number, to-be-loaded screen information corresponding to a screen number, release storage space occupied by screen information corresponding to at least some screen numbers, nonadjacent to the target screen number, in the first memory 1120, and load, to the first memory 1120, the to-be-loaded screen information corresponding to the screen number.

The preset quantity refers to a quantity of pieces of screen information of an application stored in the first memory 1120. The predetermined quantity refers to a quantity of screen numbers adjacent to each side of the target screen number.

The processor 1160 may release the storage space occupied by the screen information corresponding to the at least some screen numbers, nonadjacent to the target screen number, in the first memory 1120 and load, to the first memory 1120, screen information corresponding to the screen number adjacent to the target screen number in order to load screen information cyclically and relieve a contradiction between a limitation on a storage capacity of the terminal 1100 and an ever-increasing quantity of application screens.

Determining, according to the screen number stored in the first memory 1120 and the screen number adjacent to the target screen number, to-be-loaded screen information corresponding to a screen number includes determining, according to the screen number stored in the first memory 1120 and the screen number adjacent to the target screen number, a screen number that is not stored in the first memory 1120, where screen information corresponding to the screen number that is not stored is to-be-loaded screen information corresponding to a screen number in the first memory 1120.

It should be noted that the processor 1160 may call a screen element that corresponds to the target screen number and that is stored in the first memory 1120 and information about a location, at which the screen number is displayed, on an application screen that corresponds to the screen number, to display the screen element on the application screen that corresponds to the target screen number. The screen element may be an application icon, a home screen widget, or the like.

In this embodiment of the present disclosure, the terminal 1100 may further include a second memory 1121, where the second memory 1121 may be configured to store screen information of all applications of the terminal 1100. The loading, by the processor 1160 and to the first memory 1120, the to-be-loaded screen information corresponding to the screen number includes calling, by the processor 1160, to-be-loaded screen information corresponding to a screen number in the second memory 1121, and loading, to the first memory 1120, the to-be-loaded screen information corresponding to the screen number.

It can be understood that the second memory 1121 may be an external memory of the terminal 1100, and the first memory 1120 may be a memory of the terminal 1100. The processor 1160 may load, from the second memory 1121, a preset quantity of pieces of screen information to the first memory 1120. Each piece of loaded screen information corresponds to one block of storage space in the first memory 1120. Optionally, all blocks of storage space may be the same. The first memory 1120 may be an non-volatile memory (NVM), an NVRAM, a dynamic random access memory (DRAM), a static random access memory (SRAM), a flash memory, or the like. The second memory 1121 may be a hard disk, an optical disk, a universal serial bus (USB) disk, a floppy disk, a tape drive, or the like.

In this embodiment of the present disclosure, all screen information of the terminal may be stored in a cloud server, where the cloud server may be the second memory 1121. The loading, by the processor 1160 and to the first memory 1120, the to-be-loaded screen information corresponding to the screen number includes obtaining, by the processor 1160 using a network channel, to-be-loaded screen information that is corresponding to a screen number and that is in the cloud server, and loading, to the first memory 1120, the to-be-loaded screen information corresponding to the screen number.

The input unit 1130 may be configured to receive a digit or character information that is input, and generate signal input related to user settings and function control of the terminal 1100. Further, in this embodiment of the present disclosure, the input unit 1130 may include a touch panel 1131. The touch panel 1131 is also referred to as a touchscreen and can collect a touch operation (such as an operation performed by the user on the touch panel 1131 or on the touch panel 1131 with a finger or using any proper object or accessory such as a stylus) of the user on or near the touch panel 1131, and drive a corresponding connection apparatus according to a preset program. Optionally, the touch panel 1131 may include two parts a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information to contact coordinates, and sends the contact coordinates to the processor 1160, and can receive and execute a command sent by the processor 1160. In addition, the touch panel 1131 may be implemented in multiple types, such as a resistive type, a capacitive type, an infrared type, and a surface acoustic wave type. In addition to the touch panel 1131, the input unit 1130 may further include an input device 1132. The input device 1132 may include but is not limited to one or more of a keyboard, a function key (for example, a volume control key or a power on/off key), a trackball, a mouse, or a joystick.

The terminal 1100 may further include a display unit 1140, where the display unit 1140 may be configured to display information input by the user or information provided to the user, and menu screens of the terminal 1100. The display unit 1140 may include a display panel 1141. Optionally, the display panel 1141 may be configured in a form of an Liquid Crystal Display (LCD), an Organic Light-Emitting Diode (OLED), or the like.

In this embodiment of the present disclosure, the touch panel 1131 covers the display panel 1141 to form a touch display screen. After detecting a touch operation on or near the touch display screen, the touch display screen transfers the touch operation to the processor 1160 to determine a type of a touch event, and then the processor 1160 provides corresponding visual output on the touch display screen according to the type of the touch event.

In this embodiment of the present disclosure, the touch display screen includes an application screen display zone and a common widget display zone. An arrangement manner of the application screen display zone and the common widget display zone is not limited, and may be an arrangement manner such as up-and-down arrangement or left-and-right arrangement that can distinguish the two display zones. The application screen display zone may be used to display an application screen. Each screen may include at least one screen element such as an application icon and/or a home screen widget. The application screen display zone may also be an empty screen that does not include any content. The common widget display zone displays a widget with a relatively high utilization rate, for example, an application icon such as a setting button icon, a screen number icon, a scroll bar icon, or a telephone book icon.

The processor 1160 is a control center of the terminal 1100, connects parts of the entire terminal 1100 using various screens and lines, and executes various functions of the terminal 1100 and processes data by running or executing software programs and/or modules stored in the first memory 1120 and calling data stored in the second memory 1121 in order to perform overall monitoring on the terminal 1100. Optionally, the processor 1160 may include one or more processing units.

It can be understood that during initialization of the processor 1160, a preset quantity of pieces of screen information may be loaded to the first memory 1120 from the screen information stored in the second memory 1121, and screen numbers corresponding to the preset quantity of pieces of screen information are recorded. The processor 1160 reads, from the first memory 1120, any piece of screen information or screen information of a predetermined number, generates a screen according to the screen information, controls the application screen display zone of the touch display screen to display the generated screen as an initial screen, controls the common widget display zone to display a screen number, and provides a user selection screen. The screen number displayed in the common widget display zone may be the screen number corresponding to the screen information that has been loaded in the first memory 1120, or may be the screen number corresponding to the screen information stored in the second memory 1121. The preset quantity is not greater than a maximum quantity of pieces of screen information that can be stored by the first memory 1120.

Optionally or further, the processor 1160 may control at least some screen numbers in screen numbers displayed in the common widget display zone, to respond to a user input operation.

For example, in a screen number displayed in the common widget display zone, the processor 1160 controls a screen number corresponding to loaded screen information to respond to a user input operation, and controls a screen number corresponding to unloaded screen information not to respond to a user input operation. The terminal 1100 further includes an audio circuit 1170, a WI-FI module 1180, a radio frequency (RF) circuit 1110, and a power source 1190.

Figure 12:
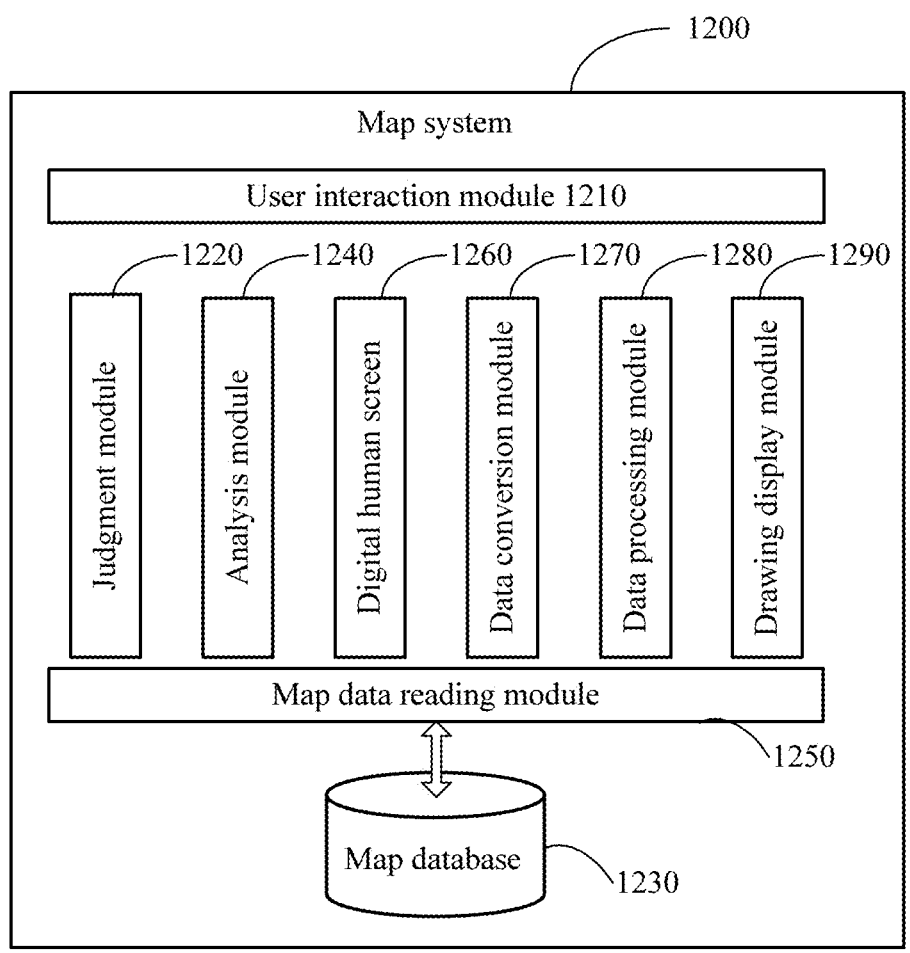
FIG. 12 is a schematic block diagram of a map system according to an embodiment of the present disclosure.

As shown in FIG. 12, an embodiment of the present disclosure further provides a map system 1200. In this embodiment of the present disclosure, the map system 1200 includes a user interaction module 1210 configured to interact with a user, and receive and respond to a user operation, a judgment module 1220 configured to determine whether a digital person display function is enabled, a map database 1230 configured to store map data, an analysis module 1240 configured to determine, according to a user instruction obtained by the user interaction module 1210, map data that needs to be read, a map data reading module 1250 configured to read the map data in the map database 1230 according to an analysis result of the analysis module 1240, a digital human screen 1260 configured to obtain profile data in a track dimension, obtained by the user interaction module 1210, of a digital person selected by the user, a data conversion module 1270 configured to convert the profile data in the track dimension, obtained by the digital human screen 1260, of the digital person to data available for the map system, a data processing module 1280 configured to process the map data and the profile data in the track dimension of the digital person, and a drawing display module 1290 configured to generate, according to the map data and the profile data in the track dimension of the digital person that are processed by the data processing module 1280, a tracing map screen for output.

In this embodiment of the present disclosure, the user interaction module 1210 is configured to receive and respond to a user input operation, and obtain a request such as viewing or searching from the user. The map database 1230 stores map data used by the map system, where the data mainly includes spatial data and related data thereof. The map data reading module 1250 is a screen for accessing data in the map database 1230. The judgment module 1220 is configured to determine whether a digital person display switch is turned on (a "digital person function" option may be set in settings of a terminal, and the user selects whether to enable the "digital person function"). The analysis module 1240 is configured to complete an analysis on the user instruction and determine the map data that needs to be read. The digital human screen 1260 is configured to obtain profile data, especially the profile data in the track dimension, obtained by the user interaction module 1210, of the digital person selected by the user, and complete management on a third-party data source, including definition and management on a screen, where herein the digital human screen 1260 mainly interacts with a digital person generation system, that is, a digital person management platform. The data conversion module 1270 is configured to convert profile data in a track dimension of a non-standard or non-map system to data available for the map system. The data processing module 1280 is configured to process the map data and the profile data in the track dimension of the digital person. The drawing display module 1290 is configured to determine the processed tracing map screen, and complete drawing of the to-be-output tracing map screen.

It should be understood that, the map system 1200 according to this embodiment of the present disclosure may correspond to an entity for executing the method in the embodiment of the present disclosure, and may further correspond to the map screen determining apparatus 900 and the map screen determining apparatus 1000 in the embodiments of the present disclosure. In addition, the foregoing and other operations and/or functions of the modules of the map system 1200 are for implementing corresponding procedures of the method in FIG. 1 to FIG. 8C, and for ease of conciseness, no details are repeated herein.

Therefore, according to the map screen determining apparatus in this embodiment of the present disclosure, profile data in a track dimension of a target digital person is obtained, map data of a target area is determined, and a tracing map screen is determined according to the profile data in the track dimension of the target digital person and the map data to indicate a track feature of the target digital person in the target area. In this case, personalized map services can be automatically and flexibly provided to a user, improving user experience.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described constituent components and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and no details are repeated herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some screens. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A map screen determining method, comprising:
   obtaining profile data in a track dimension of a target digital person from a digital person generation system, wherein the target digital person comprises a plurality of dimensions of target user profiles corresponding to a target user, and wherein the target user profiles are generated based on data received from a plurality of data sources;
   determining map data of a target area, wherein the target area is a specific map area that is customized for a user; and
   generating a visual element representing the target digital person on a tracing map screen according to the profile data in the track dimension of the target digital person and the map data, wherein the tracing map screen represents a track feature of the target digital person in the target area.

2. The method according to claim 1, wherein determining the tracing map screen comprises:
   determining, according to the profile data in the track dimension of the target digital person in the target area, a frequency at which the target digital person has appeared at a place in the target area; and
   generating, according to the frequency at which the target digital person has appeared at the place in the target area, a visual element representing the frequency at which the target digital person has appeared at the place in the target area, wherein the visual element represents the track feature of the target digital person in the target area, wherein the tracing map screen comprises the visual element.

3. The method according to claim 2, wherein the visual element is a thermodynamic diagram corresponding to the frequency at which the target digital person has appeared at the place in the target area.

4. The method according to claim 2, wherein the visual element comprises at least two different identifiers corresponding to the frequency at which the target digital person has appeared at the place in the target area.

5. The method according to claim 4, wherein the tracing map screen further comprises a legend indicating a correspondence between the at least two different identifiers and the frequency at which the target digital person has appeared at the place in the target area.

6. The method according to claim 1, wherein before obtaining the profile data in the track dimension of the target digital person, the method further comprises:
presenting a digital person display widget to the user, wherein the digital person display widget is in a first state indicating that no profile data in a track dimension of a digital person is loaded on a current map screen;
obtaining a first operation action performed by the user on the digital person display widget in the first state;
presenting a digital person selection widget to the user in response to the first operation action, wherein the digital person selection widget comprises a plurality of digital person objects available for loading; and
determining a digital person corresponding to a digital person object selected by the user as the target digital person, and
wherein after determining the tracing map screen, the method further comprises:
presenting the tracing map screen to the user; and
presenting a second state of the digital person display widget to the user, wherein the second state indicates that the profile data in the track dimension of the target digital person is loaded on the current map screen.

7. The method according to claim 6, further comprising:
obtaining a second operation action performed by the user on the digital person display widget in the second state;
determining personal background information of the target digital person in response to the second operation action; and
presenting a digital person information widget to the user, wherein the digital person information widget comprises the personal background information of the target digital person.

8. The method according to claim 1, further comprising:
obtaining a third operation action performed by the user on a target place on the tracing map screen; and
presenting a target place information widget to the user in response to the third operation action, wherein the target place information widget comprises statistical information related to the target place and the target digital person.

9. A map screen determining apparatus, comprising:
a memory comprising instructions; and
a processor coupled to the memory and configured to execute the instructions, which when executed, cause the processor to be configured to:
obtain profile data in a track dimension of a target digital person from a digital person generation system, wherein the target digital person comprises a plurality of dimensions of target user profiles corresponding to a target user, and wherein the target user profiles are generated based on data received from a plurality of data sources;
determine map data of a target area, wherein the target area is a specific map area that is customized a user; and
generating a visual element respresenting the target digital person on a tracing map screen according to the profile data in the track dimension of the target digital person and the map data, wherein the tracing map screen represents a track feature of the target digital person in the target area.

10. The apparatus according to claim 9, wherein the instructions, when executed, further cause the processor to be configured to:
determine, according to the profile data in the track dimension of the target digital person in the target area, a frequency at which the target digital person has appeared at a place in the target area; and
generate, according to the frequency at which the target digital person has appeared at the place in the target area, a visual element representing the frequency at which the target digital person has appeared at the place in the target area, wherein the visual element represents the track feature of the target digital person in the target area, wherein the tracing map screen comprises the visual element.

11. The apparatus according to claim 10, wherein the visual element is a thermodynamic diagram corresponding to the frequency at which the target digital person has appeared at the place in the target area.

12. The apparatus according to claim 10, wherein the visual element comprises at least two different identifiers corresponding to the frequency at which the target digital person has appeared at the place in the target area.

13. The apparatus according to claim 12, wherein the tracing map screen further comprises a legend indicating a correspondence between the at least two different identifiers and the frequency at which the target digital person has appeared at the place in the target area.

14. The apparatus according to claim 9, wherein the instructions, when executed, further cause the processor to be configured to:
present a digital person display widget to the user, wherein the digital person display widget is in a first state indicating that no profile data in a track dimension of a digital person is loaded on a current map screen;
obtain a first operation action performed by the user on the digital person display widget;
present a digital person selection widget to the user in response to the first operation action, wherein the digital person selection widget comprises a plurality of digital person objects available for loading;
determine a digital person corresponding to a digital person object selected by the user as the target digital person;
present the tracing map screen to the user after determining the tracing map screen according to the profile data in the track dimension of the target digital person and the map data; and
present a second state of the digital person display widget to the user, wherein the second state indicates that the profile data in the track dimension of the target digital person is loaded on the current map screen.

15. The apparatus according to claim 14, wherein the instructions, when executed, further cause the processor to be configured to:
- obtain a second operation action performed by the user on the digital person display widget in the second state;
- determine personal background information of the target digital person in response to the second operation action; and
- present a digital person information widget to the user, wherein the digital person information widget comprises the personal background information of the target digital person.

16. The apparatus according to claim 9, wherein the instructions, when executed, further cause the processor to be configured to:
- obtain a third operation action performed by the user on a target place on the tracing map screen; and
- present a target place information widget to the user in response to the third operation action, wherein the target place information widget comprises statistical information related to the target place and the target digital person.

17. The apparatus according to claim 9, wherein the apparatus is a terminal.

18. A map system, comprising:
- a display screen;
- a memory configured to store map data and instructions; and
- a processor coupled to the memory and the display screen, wherein the processor is configured to executed the instructions, which cause the processor to be configured to:
  - determine whether a digital person display function is enabled;
  - determine map data for a user in response to receiving a user instructions via a display screen;
  - obtain profile data in a track dimension of a digital person selected by the user;
  - convert the profile data in the track dimension of the digital person to data that is customized for the digital person and presentable on a tracing map screen; and
  - generate a tracing map screen for display on the displace screen according to the map data and the profile data.

19. The map system according to claim 18, wherein the target digital person comprises a plurality of dimensions of target user profiles corresponding to a target user, and wherein the target user profiles are generated based on data received from a plurality of data sources.

20. The map system according to claim 18, wherein the tracing map screen represents a track feature of the target digital person in the target area.

* * * * *